(12) United States Patent
Zhou

(10) Patent No.: US 11,490,405 B2
(45) Date of Patent: Nov. 1, 2022

(54) METHOD FOR TRANSMITTING INFORMATION, BASE STATION AND USER EQUIPMENT

(71) Applicant: BEIJING XIAOMI MOBILE SOFTWARE CO., LTD., Beijing (CN)

(72) Inventor: Juejia Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 165 days.

(21) Appl. No.: 16/968,697

(22) PCT Filed: Feb. 12, 2018

(86) PCT No.: PCT/CN2018/076513
§ 371 (c)(1),
(2) Date: Aug. 10, 2020

(87) PCT Pub. No.: WO2019/153348
PCT Pub. Date: Aug. 15, 2019

(65) Prior Publication Data
US 2020/0404689 A1    Dec. 24, 2020

(51) Int. Cl.
*H04W 72/12*    (2009.01)
*H04W 72/04*    (2009.01)
(Continued)

(52) U.S. Cl.
CPC ....... *H04W 72/1273* (2013.01); *H04L 5/0092* (2013.01); *H04W 4/70* (2018.02);
(Continued)

(58) Field of Classification Search
CPC ......... H04W 72/1273; H04W 72/1263; H04W 72/0446; H04W 72/0453; H04W 72/0493;
(Continued)

(56) References Cited

U.S. PATENT DOCUMENTS 10,917,825 B2 * 2/2021 Peisa .................... H04B 7/0626
2015/0188650 A1   7/2015 Au et al.
(Continued)

FOREIGN PATENT DOCUMENTS

CA       3044947 A1 *  5/2018   .......... H04L 1/0003
CA       3042975 A1 *  6/2018   .......... H04L 1/1812
(Continued)

OTHER PUBLICATIONS

International Search Report dated Nov. 16, 2018 in PCT/CN2018/076513, 2 pages.
(Continued)

*Primary Examiner* — Phong La
(74) *Attorney, Agent, or Firm* — Oblon, McClelland, Maier & Neustadt, L.L.P.

(57) ABSTRACT

Aspect of the disclosure provides a method that can include determining configuration information of a bandwidth part (BWP) blank transmission unit in a fifth generation (5G) new radio (NR) system. The configuration information can include a time frequency resource range of the BWP blank transmission unit, and the method can include transmitting resource configuration information to a user equipment on the basis of the configuration information of the BWP blank transmission unit, scheduling a first transmission resource at a time-frequency location of the BWP blank transmission unit so as to utilize the first transmission resource to transmit target service data, the first transmission resource being a resource scheduled on the basis of a non-5G NR communication protocol.

14 Claims, 9 Drawing Sheets

```
┌─────────────────────────────────────────────────────────┐
│ Configuration information of a BWP blank transmission   │─── 11
│        unit in a 5G NR system is determined             │
└─────────────────────────────────────────────────────────┘
                           │
                           ▼
┌─────────────────────────────────────────────────────────┐
│ Resource configuration information is transmitted to UE │
│   based on the configuration information of the BWP     │─── 12
│                  blank transmission unit                │
└─────────────────────────────────────────────────────────┘
                           │
                           ▼
┌─────────────────────────────────────────────────────────┐
│  First transmission resource is scheduled at a time-    │
│ frequency position of the BWP blank transmission unit,  │─── 13
│  so as to utilize the first transmission resource to    │
│            transmit target service data                 │
└─────────────────────────────────────────────────────────┘
```

(51) Int. Cl.
*H04W 4/70* (2018.01)
*H04L 5/00* (2006.01)

(52) U.S. Cl.
CPC ... *H04W 72/0446* (2013.01); *H04W 72/0453* (2013.01); *H04W 72/0493* (2013.01)

(58) Field of Classification Search
CPC . H04W 72/044; H04W 72/048; H04W 72/06; H04W 72/08; H04W 4/70; H04W 4/50; H04W 4/60; H04L 5/0092; H04L 5/0091; H04L 5/0094; H04L 5/0096; H04L 5/00
See application file for complete search history.

(56) References Cited

U.S. PATENT DOCUMENTS

| | | | |
|---|---|---|---|
| 2017/0331785 A1 | 11/2017 | Xu et al. | |
| 2018/0007583 A1 | 1/2018 | Hong et al. | |
| 2018/0092085 A1* | 3/2018 | Shaheen | H04W 76/16 |
| 2018/0288746 A1* | 10/2018 | Zhang | H04L 5/0048 |
| 2019/0037579 A1 | 1/2019 | Yi et al. | |
| 2019/0053211 A1* | 2/2019 | Ying | H04W 72/14 |
| 2019/0090289 A1* | 3/2019 | Huang-Fu | H04W 72/044 |
| 2019/0132793 A1* | 5/2019 | Lin | H04W 52/0274 |
| 2019/0149380 A1* | 5/2019 | Babaei | H04W 72/1268 370/330 |

FOREIGN PATENT DOCUMENTS

| | | | | |
|---|---|---|---|---|
| CA | 3057541 A1 * | 9/2018 | ........... | H04B 17/345 |
| CN | 105850177 A | 8/2016 | | |
| CN | 106165488 A | 11/2016 | | |
| CN | 107493605 A | 12/2017 | | |
| CN | 108633070 A * | 10/2018 | ........... | H04L 1/1607 |
| CN | 108696384 A * | 10/2018 | ......... | H04L 41/0206 |
| CN | 108811139 A * | 11/2018 | ........... | H04L 5/0005 |
| CN | 109995491 A * | 7/2019 | ........... | H04J 11/005 |
| CN | 109996341 A * | 7/2019 | ............... | H04L 5/00 |
| WO | WO 2017/183926 A1 | 10/2017 | | |
| WO | WO-2017183926 A1 * | 10/2017 | ............... | H04L 1/00 |
| WO | WO 2017/213687 A1 | 12/2017 | | |
| WO | WO-2018008981 A1 * | 1/2018 | ........... | H04L 1/1642 |
| WO | WO-2018145628 A1 * | 8/2018 | .............. | H04W 4/40 |
| WO | WO-2019028768 A1 * | 2/2019 | ............... | H04L 5/00 |
| WO | WO-2020143745 A1 * | 7/2020 | | |

OTHER PUBLICATIONS

Written Opinion dated Nov. 19, 2018 in PCT/CN2018/076513, 4 pages.
Extended European Search Report dated Sep. 29, 2021 in corresponding European Patent Application No. 18905566.8, 11 pages.
Office Action dated Dec. 3, 2021 in corresponding Indian Patent Application No. 202047038385 (with English Translation), 6 pages.
AT&T: "TP on Signaling Support for LTE-NR Coexistence in Overlapping and Adjacent Spectrum", 3GPP Draft; R3-174688, vol. RAN WG3, Nov. 17, 2017, XP051373240, Retrieved from the Internet: URL:http://www.3gpp.org/ftp/tsg%5Fran/WG3%5Flu/TSGR3%5F98/Docs/ [retrieved on Nov. 17, 2017].
Ericsson: "On Matching Transmissions Available Resources", 3GPP Draft; R1-1718522, vol. RAN WG1, Oct. 2017, XP051352534, Retrieved from the Internet: URL:http://www.3gpp.org/ftp/tsg_ran/WGI_RL1/TSGR1_90b/Docs/ [retrieved on Oct. 2, 2017].

* cited by examiner

METHOD FOR TRANSMITTING INFORMATION, BASE STATION AND USER EQUIPMENT

RELATED APPLICATION

This application claims the benefit of International Application No. PCT/CN2018/076513, entitled "Method for Transmitting Information, Base Station and User Equipment" and filed on Feb. 12, 2018, which is incorporated herein by reference in its entirety.

TECHNICAL FIELD

The present disclosure relates to the technical field of communications, including a method for transmitting information, a base station, and User Equipment (UE).

BACKGROUND

With the development of wireless communication technology, a mobile communication network is gradually evolving to a 5th Generation (5G) New Radio (NR) network. The 5G NR network mainly includes three types of services, i.e., enhanced Mobile Broad Band (eMBB), massive Machine Type Communication (mMTC), and Ultra Reliable Low Latency Communication (URLLC). Some services may follow a transmission scheme for the traditional network. For example, application of mMTC services in Internet of Things (IoT) is likely to be solved by following the transmission schemes for enhanced Machine Type Communication (eMTC) and Narrow Band Internet of Things (NB IoT) in a Long Term Evolution (LTE) system.

SUMMARY

A transmission scheme is needed that can embed traditional transmission resources in a 5G NR transmission resources, so as to meet the transmission needs that a 5G NR network can integrate traditional services. Exemplary embodiments of the present disclosure provide a method for transmitting information, a base station and UE, which may flexibly converge the transmission of a variety of services, which are based on a traditional network communication protocol, in the 5G NR system.

According to a first aspect of the present disclosure, there is provided a method for transmitting information which is applied to a base station. The method can include that configuration information of a Bandwidth Part (BWP) blank transmission unit in a 5G NR system is determined, the configuration information at least including a time-frequency resource range of the BWP blank transmission unit. The method can further include that resource configuration information is transmitted to UE based on the configuration information of the BWP blank transmission unit, and a first transmission resource is scheduled at a time-frequency position of the BWP blank transmission unit, so as to utilize the first transmission resource to transmit target service data, the first transmission resource being a resource scheduled based on a non-5G NR communication protocol.

Optionally, the base station includes a 5G NR base station. The operation that the configuration information of the BWP blank transmission unit in the 5G NR system is determined may include that according to a preset resource configuration rule, the configuration information of the BWP blank transmission unit can be determined within a preset frequency range of the 5G NR system, Alternatively, the configuration information of the BWP blank transmission unit can be determined according to information of a target service to be transmitted, the information of the target service to be transmitted at least including the type of the non-5G NR communication protocol applicable to target service data to be transmitted.

When the base station synchronously supports a 5G NR communication protocol and the non-5G NR communication protocol, the operation that the configuration information of the BWP blank transmission unit is determined according to the information of the target service to be transmitted may include that first resource configuration information for the target service data to be transmitted can be determined. The first resource configuration information is configuration information for allocating a transmission resource to first UE based on the non-5G NR communication protocol, and the first UE is UE for transmitting the target service data. Further, it can include that the configuration information of the BWP blank transmission unit in the 5G NR system is determined according to the first resource configuration information.

Optionally, the operation that the resource configuration information is transmitted to the UE based on the configuration information of the BWP blank transmission unit may include that the configuration information of the BWP blank transmission unit is transmitted, by the 5G NR base station, to second UE for transmitting 5G NR service data.

When the base station is a non-5G NR base station, the operation that the configuration information of the BWP blank transmission unit in the 5G NR system is determined may include that the configuration information of the BWP blank transmission unit transmitted by the 5G NR base station is acquired. Alternatively, it can include that the configuration information of the BWP blank transmission unit is detected according to reference signal configuration information of the 5G NR system.

Further, when the configuration information of the BWP blank transmission unit is periodic configuration information of the BWP blank transmission unit, the operation that the resource configuration information is transmitted to the UE based on the configuration information of the BWP blank transmission unit may include that the first resource configuration information is determined according to the information of the target service to be transmitted and the periodic configuration information of the BWP blank transmission unit. Further, the operation can include that the first resource configuration information is transmitted to the first UE for transmitting the target service data.

Optionally, the BWP blank transmission unit may include a BWP quasi blank transmission unit which is configured with a control information transmission resource, or a BWP true blank transmission unit which is not configured with the control information transmission resource.

When the base station synchronously supports the 5G NR communication protocol and the non-5G NR communication protocol, and the BWP blank transmission unit configured by the base station includes the BWP quasi blank transmission unit which is configured with a Control Resource Set (CORESET), the operation that the resource configuration information is transmitted to the UE based on the configuration information of the BWP blank transmission unit may include that it is determined whether the first UE supports the 5G NR communication protocol. Additionally, when the first UE supports the 5G NR communication protocol, the first resource configuration information can be loaded into the CORESET of the BWP quasi blank transmission unit, and the CORESET can be transmitted to the first UE.

Optionally, the first resource configuration information includes scheduling control information of the first transmission resource and system control information. The operation that the first resource configuration information is loaded into the CORESET of the BWP quasi blank transmission unit may include any one of the scheduling control information of the first transmission resource and the system control information are loaded into the CORESET of the BWP quasi blank transmission unit; the system control information is loaded into the CORESET of the BWP quasi blank transmission unit; or the scheduling control information of the first transmission resource is loaded into the CORESET of the BWP quasi blank transmission unit.

In an embodiment, target service data can include eMTC and NB IoT services that perform data transmission based on the communication protocol of the LTE system.

According to a second aspect of the present disclosure, there is provided a method for transmitting information which is applied to the first UE for transmitting the target service data. The target service data can be the service data transmitted based on the non-5G NR communication protocol. The method can include that the first resource configuration information transmitted by the base station is acquired, the first resource configuration information being configured to inform the first UE of allocation information for the first transmission resource. The method can further include that, according to the first resource configuration information, the target service data is transmitted through the first transmission resource which is scheduled by the base station at the time-frequency position of the BWP blank transmission unit.

Optionally, when the first UE supports the 5G NR communication protocol, the operation that the first resource configuration information transmitted by the base station is acquired may include that preset system configuration information delivered by the base station is acquired, the preset system configuration information being configured to indicate set position information of the first resource configuration information in the CORESET of the BWP quasi blank transmission unit, Further, when the base station schedules the BMP quasi blank transmission unit, the first resource configuration information can be acquired from the CORESET of the BWP quasi blank transmission unit according to the set position information.

According to a third aspect of the present disclosure, there is provided a method for transmitting information, which is applied to the second UE for transmitting the 5G NR service data, the 5G NR service data being the service data transmitted based on the 5G NR communication protocol. The method can include that the configuration information of the BWP blank transmission unit is acquired, the configuration information including the time-frequency resource range of the BWP blank transmission unit. The method can further include that, according to the configuration information, the 5G NR service data is not transmitted when the base station schedules the BWP blank transmission unit, and the 5G NR service data can be transmitted by utilizing a transmission resource that is scheduled by the base station and outside of the BWP blank transmission unit.

According to a fourth aspect of the present disclosure, there is provided a device for transmitting information that can be configured in the base station. The device can include a configuration information determining module that is configured to determine the configuration information of the BWP blank transmission unit in the 5G NR system, the configuration information at least including the time-frequency resource range of the BWP blank transmission unit. The device can further include a transmitting module that is configured to transmit the resource configuration information to the UE based on the configuration information of the BWP blank transmission unit, and a scheduling module that is configured to schedule the first transmission resource at the time-frequency position of the BWP blank transmission unit, so as to utilize the first transmission resource to transmit the target service data, the first transmission resource being the resource scheduled based on the non-5G NR communication protocol.

Optionally, the base station includes the 5G NR base station. The configuration information determining module may include a first configuring submodule that is configured to determine, according to the preset resource configuration rule, the configuration information of the BWP blank transmission unit within the preset frequency range of the 5G NR system. Alternatively, the information determining module can include a second configuring submodule that is configured to determine, according to the information of the target service to be transmitted, the configuration information of the BWP blank transmission unit, the information of the target service to be transmitted at least including the type of the non-5G NR communication protocol applicable to the target service data to be transmitted.

Optionally, the base station synchronously supports the 5G NR communication protocol and the non-5G NR communication protocol. The second configuring submodule may include a first configuration information determining unit that is configured to determine the first resource configuration information for the target service data to be transmitted, the first resource configuration information being configuration information for allocating the transmission resource for the first UE based on the non-5G NR communication protocol, and the first UE being UE for transmitting the target service data. The second configuring submodule can further include a second configuration information determining unit that can be configured to determine, according to the first resource configuration information, the configuration information of the BWP blank transmission unit in the 5G NR system.

Optionally, the transmitting module may include a blank configuration transmitting submodule that is configured to transmit, by the 5G NR base station, the configuration information of the BWP blank transmission unit to the second UE for transmitting 5G NR service data.

Optionally, the base station is the non-5G NR base station. The configuration information determining module may include a configuration information acquiring submodule that is configured to acquire the configuration information of the BWP blank transmission unit transmitted by the 5G NR base station. Alternatively, the configuration information determining module can include a configuration information detecting submodule that is configured to detect the configuration information of the BWP blank transmission unit according to reference signal configuration information of the 5G NR system.

When the configuration information of the BWP blank transmission unit determined by the configuration information determining module is the periodic configuration information of the BWP blank transmission unit, the transmitting module can include a first resource configuration determining submodule that is configured to determine the first resource configuration information according to the information of the target service to be transmitted and the periodic configuration information of the BWP blank transmission unit, and a transmitting submodule that is configured to transmit the first resource configuration information to the first UE for transmitting the target service data.

Optionally, the BWP blank transmission unit includes: the BWP quasi blank transmission unit which is configured with the control information transmission resource, or the BWP true blank transmission unit which is not configured with the control information transmission resource.

When the base station synchronously supports the 5G NR communication protocol and the non-5G NR communication protocol, and the BWP blank transmission unit configured by the base station includes the BWP quasi blank transmission unit which is configured with the CORESET, the transmitting module may include a protocol determining submodule that is configured to determine whether the first UE supports the 5G NR communication protocol, and a first transmitting submodule that is configured to load, when the first UE supports the 5G NR communication protocol, the first resource configuration information into the CORESET of the BWP quasi blank transmission unit, and transmit the CORESET to the first UE.

Optionally, the first resource configuration information includes the scheduling control information of the first transmission resource and the system control information.

The first transmitting submodule may include any one of: a first loading unit that is configured to load the scheduling control information of the first transmission resource and the system control information into the CORESET of the BWP quasi blank transmission unit; a second loading unit that is configured to load the system control information into the CORESET of the BWP quasi blank transmission unit; and a third loading unit that is configured to load the scheduling control information of the first transmission resource into the CORESET of the BWP quasi blank transmission unit.

Optionally, the target service data includes the eMTC and NB IoT services that perform data transmission based on the communication protocol of the LTE system.

According to a fifth aspect of the present disclosure, there is provided a device for transmitting information, which is configured in the first UE for transmitting the target service data, the target service data being the service data transmitted based on the non-5G NR communication protocol. The device can include an information acquiring module that is configured to acquire the first resource configuration information which is transmitted by the base station, the first resource configuration information being configured to inform the first UE of the allocation information for the first transmission resource. Further, the device can include a transmitting module that is configured to transmit, according to the first resource configuration information, the target service data through the first transmission resource which is scheduled by the base station at the time-frequency position of the BWP blank transmission unit.

Optionally, when the first UE supports the 5G NR communication protocol, the information acquiring module may include a system information acquiring submodule that is configured to acquire the preset system configuration information which is delivered by the base station, the preset system configuration information being configured to indicate the set position information of the first resource configuration information in the CORESET of the BWP quasi blank transmission unit. Additionally, the module can include a configuration information acquiring submodule that is configured to acquire, when the base station schedules the BMP quasi blank transmission unit, the first resource configuration information from the CORESET of the BWP quasi blank transmission unit according to the set position information.

According to a sixth aspect of the present disclosure, there is provided a device for transmitting information, which is configured in the second UE for transmitting the 5G NR service data, the 5G NR service data being the service data transmitted based on the 5G NR communication protocol. The device can include a configuration information acquiring module that is configured to acquire the configuration information of the BWP blank transmission unit, the configuration information including the time-frequency resource range of the BWP blank transmission unit. In addition, the device can include a transmission stopping module that is configured to not transmit, according to the configuration information, the 5G NR service data when the base station schedules the BWP blank transmission unit, and a transmitting module that is configured to transmit the 5G NR service data by utilizing the transmission resource that is scheduled by the base station and outside of the BWP blank transmission unit.

According to a seventh aspect of the present disclosure, there is provided a non-transitory computer-readable storage medium, on which computer instructions are stored. When executed by a processor, the instructions implement the steps of any method in the first aspect.

According to an eighth aspect of the present disclosure, there is provided a non-transitory computer-readable storage medium, on which computer instructions are stored. When executed by a processor, the instructions implement the steps of any method in the second aspect.

According to a ninth aspect of the present disclosure, there is provided a non-transitory computer-readable storage medium, on which computer instructions are stored. When executed by a processor, the instructions implement the steps of the method in the third aspect.

According a tenth aspect of the present disclosure, there is provided a base station, which can include a processor and a memory configured to store instructions executable for the processor. The processor can be configured to determine the configuration information of the BWP blank transmission unit in the 5G NR system, the configuration information at least including the time-frequency resource range of the BWP blank transmission unit, and transmit the resource configuration information to the UE based on the configuration information of the BWP blank transmission unit. Further, the processor can be configured to schedule the first transmission resource at the time-frequency position of the BWP blank transmission unit, so as to utilize the first transmission resource to transmit target service data, the first transmission resource being the resource scheduled based on the non-5G NR communication protocol.

According to the eleventh aspect of the present disclosure, there is provided UE, which is configured to transmit the target service data based on the non-5G NR communication protocol. The UE can include a processor and memory configured to store the instructions executable for the processor. The processor can be configured to acquire the first resource configuration information which is transmitted by the base station, the first resource configuration information being configured to inform the first UE of the allocation information for the first transmission resource. Additionally, the processor can be configured to, according to the first resource configuration information, transmit the target service data through the first transmission resource which is scheduled by the base station at the time-frequency position of the BWP blank transmission unit.

According to the twelfth aspect of the present disclosure, there is provided UE, which is configured to transmit the 5G NR service data based on the 5G NR communication protocol. The UE include a processor and a memory configured to store the instruction executable for the processor. The processor is configured to acquire the configuration information of the BWP blank transmission unit, the configuration information including the time-frequency resource range of the BWP blank transmission unit. Additionally, the processor can, according to the configuration information, not transmit the 5G NR service data when the base station schedules the BWP blank transmission unit, and transmit the 5G NR service data by utilizing the transmission resource that is scheduled by the base station and outside of the BWP blank transmission unit.

The technical solutions provided in the embodiments of the present disclosure have beneficial effects. For example, in the method for transmitting information provided by the present disclosure, the 5G NR base station can configure the BWP blank transmission unit when configuring the transmission resource, so as to reserve a time-frequency resource position for the transmission of the target service data based on the non-5G NR communication protocol. When there is the target service data to be transmitted, the first transmission resource can be scheduled, at the position of the BWP blank transmission unit, for the transmission of the target service data. Thus, by means of the method for transmitting information provided by the present disclosure, in the process of the base station allocating 5G NR service transmission resources for the second UE, the flexible scheduling of the first transmission resource is realized by configuring the BWP blank transmission unit. The convergent transmission of a variety of services is realized to enhance the transmission service type of the 5G NR network, which improves the user experience of the 5G NR network.

It should be understood that the above general descriptions and detailed descriptions below are only exemplary and explanatory, and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 5-1 is a schematic diagram of a scenario of transmitting information according to an exemplary embodiment of the present disclosure.

FIG. 5-2 is a schematic diagram of another scenario of transmitting information according to an exemplary embodiment of the present disclosure.

FIG. 5-3 is a schematic diagram of another scenario of transmitting information according to an exemplary embodiment of the present disclosure.

FIG. 8-1 is a schematic diagram of a scenario of transmitting information according to an exemplary embodiment of the present disclosure.

FIG. 8-2 is a schematic diagram of another scenario of transmitting information according to an exemplary embodiment of the present disclosure.

FIG. 8-3 is a schematic diagram of another scenario of transmitting information according to an exemplary embodiment of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The execution subjects involved in the present disclosure include base stations and UE. The base stations may include 5G NR base stations and sub-base stations which are equipped with large-scale antenna arrays, and may further include traditional base stations, such as LTE base stations, 3G base stations, 2G base stations, and the like. The UE may be user terminals, user nodes, mobile terminals or tablet computers, and the like. In the present disclosure, the UE may include first UE and second UE. The first UE may transmit target service data based on a traditional network communication protocol, and the second UE may transmit 5G NR service data based on a 5G NR communication protocol. It should be noted that if UE may transmit both the target service data and the 5G NR service data, the first UE and the second UE may be the same UE. In a specific implementation process, the base station and the UE are independent, and connected to each other at the same time, so as to jointly implement the technical solutions provided by the present disclosure.

An application scenario of the present disclosure may be that: in the process of transmitting a 5G NR service, target UE needs to interleave the transmission of preset target service data, such as the service data of the traditional 2G, 3G and 4G LTE systems, or in the process of configuring a 5G NR transmission resource for the second UE, the base station needs to interleave for the first UE the configuration of a traditional network transmission resource, i.e., a first transmission resource.

For the transmission of the 5G NR service, the 5G NR base station uses a BWP as a basic scheduling unit to schedule. For the first transmission resource carrying the transmission of the target service data, the basic scheduling unit is no longer the BWP. For example, for eMTC and NB IoT services following an LTE transmission mechanism, the base station needs to use a frame with a duration of 10 ms as the basic scheduling unit to schedule. In the present disclosure, the base station scheduling the first resource may be the traditional non-5G NR base station. If the base station synchronously supports the 5G NR communication protocol and the non-5G NR communication protocol, the first transmission resource may also be scheduled.

Figure 1:
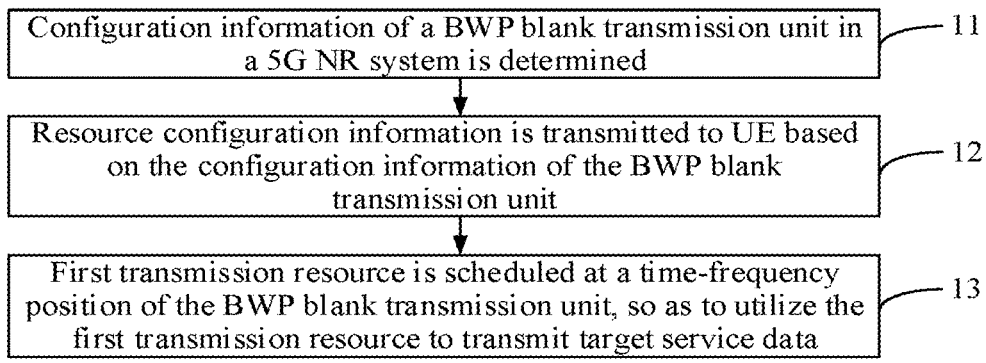
FIG. 1 is a flowchart of a method for transmitting information according to an exemplary embodiment of the present disclosure.

Based on the above application scenario, the present disclosure provides a method for transmitting information, which is applied to the base station. Referring to FIG. 1 that illustrates a flowchart of the method for transmitting information according to an exemplary embodiment, the method may include the following steps.

In block 11, the configuration information of the BWP blank transmission unit in the 5G NR system is determined, the configuration information at least including the time-frequency resource range of the BWP blank transmission unit.

In the present disclosure, when the 5G NR base station allocates the transmission resources for the UE, considering the need to transmit the non-5G NR service data on certain frequency bands, the 5G NR base station may configure some BWP blank transmission units when allocating the resources, so that the 5G NR base station or the traditional base station may schedule, at the position of the BWP blank transmission unit, the UE based on the non-5G NR communication protocol to transmit the target service data.

In the present disclosure, according to whether the current base station has a BWP configuration function, the implementation in block 11 may include the following situations.

First situation, the current base station supports the 5G NR communication protocol, and has the capability of allocating BWP resources. For the first situation, the current base station has the capability of allocating the BWP resources, and accordingly has the capability of allocating the BWP blank transmission units. The current base station may be either the 5G NR base station supporting the 5G NR communication protocol, or the base station synchronously supporting the 5G NR communication protocol and the traditional communication protocol such as an LTE communication protocol.

Assuming that the current base station is the 5G NR base station mentioned above, the base station may determine the configuration information of the BWP blank transmission unit in at least two following manners.

First manner, according to a preset resource configuration rule, the configuration information of the BWP blank transmission unit is determined within a preset frequency range of the 5G NR system. Exemplarily, assuming that the 5G NR system may transmit both the service data based on the LTE communication protocol, such as the eMTC or NB IoT service data, and the 5G NR service data on a preset frequency band, for example, 2600 MHz, the base station may follow the preset resource configuration rule of the 5G NR system, for example, when the transmission resources are configured on the frequency band of 2600 MHz, the BWP blank transmission unit is configured periodically according to a preset period interval length. For example, a preset number of BWP blank transmission units are configured every is interval. The configuration information of the BWP blank transmission units may include: the period interval length of the BWP blank transmission unit, time-frequency range information of each BWP blank transmission unit, the number of the BWP blank transmission units set in a configuration period, and so on.

In such a manner, no matter whether there is currently target service data to be transmitted, the base station reserves the BWP blank transmission unit, so that the base station may allocate the first transmission resource for the target service data to be transmitted according to the preset non-5G NR communication protocol within the time-frequency range corresponding to the BWP blank transmission unit.

The target service data refers to the service data which are transmitted based on the non-5G NR communication protocol, such as the service data in the 2G, 3G and 4G LTE network systems, as well as the service data of eMTC and NB IoT, following an LTE network transmission mechanism, in the 5G NR network.

Second manner, the current base station may determine the configuration information of the BWP blank transmission unit in real time and dynamically according to the information of the target service to be transmitted. In such a manner, the base station may acquire the information of the target service to be transmitted such as target service volume to be transmitted, and may determine the non-5G NR communication protocol applicable to the target service to be transmitted. Thus, how many blank resources are reserved for the target service data to be transmitted may be determined, and then the configuration information of the BWP blank transmission unit is determined.

The implementation of the second manner may also include two situations.

First situation, the current base station does not support the non-5G NR communication protocol. The base station receives the information of the target service to be transmitted, such as the service volume to be transmitted and the duration of the basic scheduling unit, sent by the non-5G NR base station through a interface between the base stations, so as to determine the configuration information of the BWP blank transmission unit according to the information of the target service to be transmitted.

Second situation, the current base station has the capability of allocating the BWP resources according to the 5G NR communication protocol and allocating the first transmission resource for the target service data to be transmitted according to the non-5G NR communication protocol. For the second situation, in an embodiment of the present disclosure, the current base station may first determine first resource configuration information according to the information of the target service to be transmitted, and then adaptively determine the configuration information of the BWP blank transmission unit based on the first resource configuration information.

Figure 2:
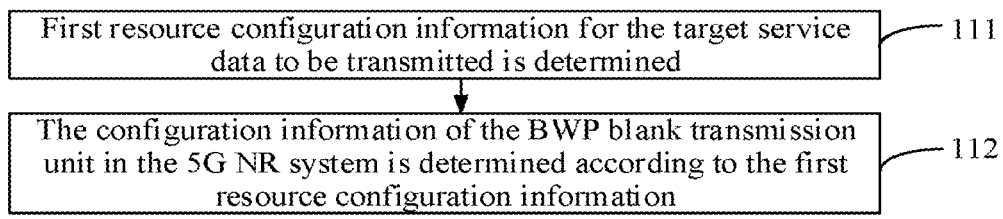
FIG. 2 is a flowchart of another method for transmitting information according to an exemplary embodiment of the present disclosure.

Referring to FIG. 2 that illustrates a flowchart of a method for transmitting information according to an exemplary embodiment, block 11 may include the following step.

In block 111, the first resource configuration information for the target service data to be transmitted is determined, the first resource configuration information being configuration information for allocating, by the base station, the transmission resources for the first UE based on the non-5G NR network communication protocol.

In the present disclosure, the base station may detect in real time whether the target service data to be transmitted exists. If the target service data to be transmitted exists, the base station may determine, based on the information of the target service to be transmitted, how to allocate the transmission resources for the UE.

Figure 3:
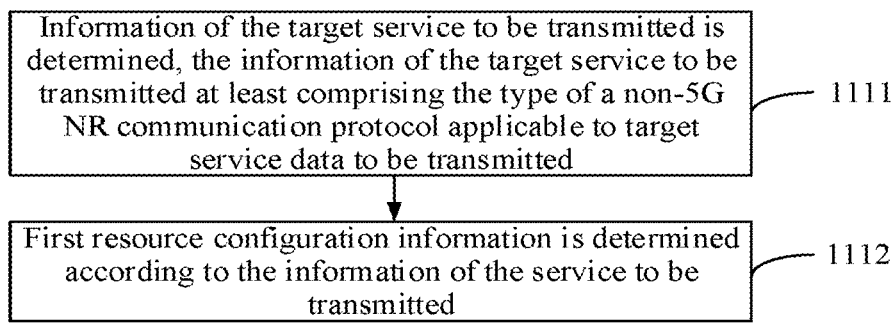
FIG. 3 is a flowchart of another method for transmitting information according to an exemplary embodiment of the present disclosure.

Referring to FIG. 3 that illustrates a flowchart of another method for transmitting information according to an exemplary embodiment, block 111 may include the following step.

In block 1111, the information of the target service to be transmitted is determined, the information of the target service to be transmitted at least including the type of the non-5G NR communication protocol applicable to the target service data to be transmitted.

In the present disclosure, the 5G NR base station has the capability of identifying network communication mechanisms needed by different services. That is, the base station may determine, according to the detected type of the service to be transmitted, the network communication protocol applicable to the current service to be transmitted.

In an embodiment of the present disclosure, a preset list may be stored in the 5G NR base station. The preset list includes a corresponding relationship between service types and network communication protocols, exemplarily as shown in Table 1.

TABLE 1

| Type of services | Network communication protocol |
|---|---|
| Embb, mMTC, URLLC | 5G NR |
| Emtc; NB IoT . . . | LTE |
| Type of 3G services | 3G |
| Type of 2G services | 2G |

As shown in Table 1, the base station may determine the network communication protocol according to the type of the service to be transmitted.

The base station may determine the information of the target service to be transmitted, for example, the type of a target network communication protocol applicable to the target service data to be transmitted, when it determines that it is needed to converge the transmission of the target service data during transmitting the 5G NR service data. The information of the target service to be transmitted may further include: the data volume of the target service data to be transmitted, the time to transmit the target service, etc.

In block 1112, first resource configuration information is determined according to the information of the service to be transmitted, the first resource configuration information being configuration information configured by the base station for the first transmission resource carrying the target service data.

After the base station determines the information of the target service to be transmitted, allocation information of the transmission resources on a time domain and a frequency domain may be determined according to the target network communication protocol. In the present disclosure, the first resource configuration information may include: information such as a frequency range, a time domain range, a basic scheduling unit of the first transmission resource.

For example, if the base station detects that the target service to be transmitted for target first UE is an eMTC service, the base station may determine that the transmission resource is allocated for the first UE based on an LTE network communication protocol. That is, the base station needs to use a frame defined in an LTE system as the basic scheduling unit, to allocate the transmission resource, i.e., the first transmission resource, for the target first UE.

When the first resource configuration information is determined, the base station may determine the frequency range of the first transmission resource according to a radio frequency support capability of the target first UE bearing the eMTC service, and determine information such as the time domain range of the first transmission resource according to the data volume of the target service data to be transmitted.

In block 112, the configuration information of the BWP blank transmission unit in the 5G NR system is determined according to the first resource configuration information, the configuration information at least including the time-frequency resource range of the BWP blank transmission unit.

According to related knowledge, in the 5G NR system, the base station uses the BWP transmission unit as the basic scheduling unit for resource configuration. As for BWP, in the 5G NR system, the bandwidth of a single band will be close to 1 GHz, and the bandwidth level of a single carrier is between 80 MHz and 400 MHz. For the sake of energy saving of the UE and other considerations, a single carrier is divided into a plurality of BWPs, for example, the bandwidth of one BWP may be 5 MHz, so that the base station schedules the transmission resources in units of the BWP.

The above description mainly involves the frequency range of the BWP transmission unit. In the time domain, the duration of one BWP transmission unit may be a sub-frame, a slot, a mini-slot, a symbol, etc. A symbol takes the shortest time. The mini-slot may include several symbols, for example, five symbols. The slot includes slightly more symbols than the mini-slot, for example, a slot consists of seven symbols.

In the present disclosure, when the base station detects the target service data to be transmitted, the BWP transmission unit planned to be scheduled may be set as a blank data transmission unit. That is, a data transmission resource of the BWP transmission unit is set as empty, and the second UE is not instructed to carry out the transmission of any 5G NR service data. A blank time-frequency position is reserved so that the base station may schedule the first transmission resource for the first UE at the blank position.

In the present disclosure, in the non-5G NR network communication protocol, the bandwidth of the basic scheduling unit is fixed and generally does not exceed the bandwidth range of the BWP. Thus, when the base station sets the BWP blank transmission unit for the preset target service, it only needs to ensure, in the frequency domain, that a working frequency range of the target first UE falls into the frequency range of the BWP blank transmission unit.

When determining the time domain range of the BWP blank transmission unit, it is necessary to consider the duration range of the basic scheduling unit which is specified by the non-5G NR network communication protocol. For example, according to the LTE network communication protocol, the frame is the basic scheduling unit, and 1 frame is equal to 10 ms. Assuming that the required resource for the target service to be transmitted is 1 frame, the total duration of the BWP blank transmission unit set by the base station is no less than 10 ms.

Therefore, the configuration information of the BWP blank transmission unit determined by the base station may include the frequency range and the time domain range of the BWP blank transmission unit. Information of the time domain range may be expressed as a unit duration of a basic BWP blank transmission unit and the number of the basic BWP blank transmission units. As the examples above, assuming that the unit duration of a basic BWP blank transmission unit is a time slot, i.e., 0.5 ms, the base station needs to set 20 BWP blank transmission units for the preset target service data.

Second situation, the current base station is a non-5G NR base station, which does not support the 5G NR communication protocol, and does not have the capability of allocating the BWP resources.

In the embodiments of the present disclosure, the non-5G NR base station may determine the configuration information of the BWP blank transmission unit in at least two following manners.

First manner, the configuration information of the BWP blank transmission unit transmitted by the 5G NR base station is acquired. Assuming that the non-5G NR base station is an LTE base station, in an embodiment of the present disclosure, the LTE base station may actively request the 5G NR base station to transmit the configuration information of the BWP blank transmission unit through the interface between the base stations. Or the LTE base station may passively receive the configuration information of the BWP blank transmission unit transmitted by the 5G NR base station through the interface between the base stations according to a preset rule.

Second manner, corresponding to the first manner in the first situation, that is, the situation where the 5G NR base station periodically configures, according to the preset resource configuration rule, the BWP blank transmission unit for the preset frequency range of the 5G NR system, the non-5G NR base station may detect the configuration information of the BWP blank transmission unit according to reference signal configuration information of the 5G NR system.

It is still assumed that the non-5G NR base station is the LTE base station, in the embodiments of the present disclosure, the LTE base station may acquire the reference signal configuration information in the 5G NR system in advance. Then the LTE base station may detect, according to the reference signal configuration information in the 5G NR system, a reference signal of the 5G NR system in a preset frequency band, for example, 2600 MHz. If the reference signal of the 5G NR system is not detected in a target time-frequency range, it may be determined that the target time-frequency range corresponds to the BWP blank transmission unit in the 5G NR system. According to the distribution of the BWP blank transmission units detected within a period of time, the configuration information of the BWP blank transmission unit in the 5G NR system may be determined indirectly.

In block 12, the resource configuration information is transmitted to the UE based on the configuration information of the BWP blank transmission unit.

In the present disclosure, the UE includes: the first UE for transmitting the target service data based on the non-5G NR communication protocol, and the second UE for transmitting the 5G NR service data based on the 5G NR communication protocol.

Correspondingly, the operation that the resource configuration information is transmitted to the UE in block 12 may include that: the first resource configuration information is transmitted to the first UE. The first resource configuration information being the configuration information for allocating, by the base station, the first transmission resource for the first UE based on the 5G NR communication protocol. The basic scheduling unit of the first transmission resource may be a basic transmission unit in the LTE system, i.e., the frame with a duration of 10 ms.

Block 12 may further include that: the configuration information of the BWP blank transmission unit is transmitted to the second UE by the 5G NR base station. In an embodiment of the present disclosure, if the configuration information of the BWP blank transmission unit determined by the base station belongs to the situation where the 5G NR base station periodically configures the BWP blank transmission unit in the preset frequency range, for example, the first manner in the first situation, or the second situation, that is, the situation where the base station first acquires periodic configuration information of the BWP blank transmission unit, and then configures the first transmission resource according to the information of the target service to be transmitted.

Figure 4:
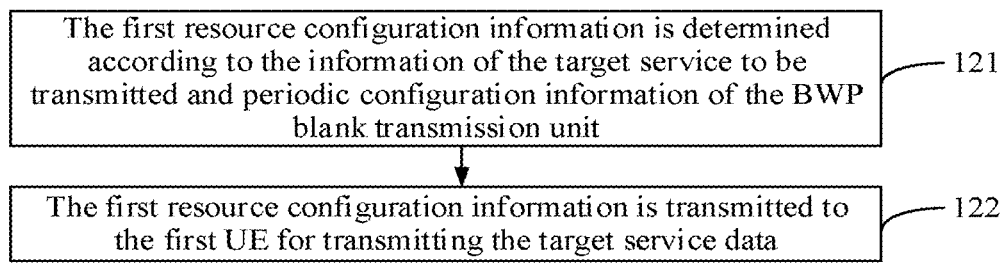
FIG. 4 is a flowchart of another method for transmitting information according to an exemplary embodiment of the present disclosure.

The operation that the first resource configuration information is transmitted to the first UE based on the configuration information of the BWP blank transmission unit may refer to FIG. 4 that illustrates a flowchart of another method for transmitting information according to an exemplary embodiment. Block 12 may include the following steps.

In S121, the first resource configuration information is determined according to the information of the target service data to be transmitted and the periodic configuration information of the BWP blank transmission unit.

In the embodiments of the present disclosure, the base station may determine, according to the periodic configuration information of the BWP blank transmission unit, within what time-frequency range the first transmission resource may be allocated for the target service data to be transmitted, and how to allocate the first transmission resource.

If the total duration of a preset number of BWP blank transmission units that are continuously configured by the 5G NR base station in a configuration period is no less than the duration (for example, 1 frame) of a basic scheduling unit in the non-5G NR communication protocol, the non-5G NR base station or the base station supporting the allocation for the transmission resource based on the non-5G NR communication protocol may determine the first resource configuration information according to the information of the target service to be transmitted and the configuration information of the BWP blank transmission unit.

Exemplarily, assuming that the configuration information of the BWP blank transmission unit indicates that the unit duration of a basic BWP blank transmission unit is a time slot, i.e., 0.5 ms, the base station configures 22 BWP blank transmission units in a configuration period.

Assuming that the first transmission resource is configured by the non-5G NR base station, the non-5G NR base station may use the time-frequency position of the 22 blank BWP transmission units to configure a basic information transmission unit with a duration of 10 ms, i.e., 1 frame, for the first UE, and determine frequency resource information corresponding to the frame. Then, the number of frames to be configured within a BWP frequency range is determined based on the data volume of the target service data to be transmitted. In the case of a large amount of target service data to be transmitted, the first transmission resource may be configured in the configuration period of a plurality of BWP blank transmission units. The first resource configuration information is determined according to the above information.

In block 122, the first resource configuration information is transmitted to the first UE for transmitting the target service data. In the present disclosure, after determining the first resource configuration information, the non-5G NR base station or the base station that synchronously supports the non-5G NR communication protocol and the 5G NR communication protocol may transmit the first resource configuration information to the first UE based on system broadcast signaling, upper signaling and physical layer signaling.

In the disclosure, the base station may configure two kinds of BWP blank transmission units, which are respectively a BWP quasi blank transmission unit configured with control information transmission resource and a BWP true blank transmission unit not configured with the control information transmission resource. In the disclosure, the control information transmission resource is the resource for transmitting system control information, and includes at least one of the followings: a CORESET, a reference signal resource, a synchronous signal resource, a broadcast signal resource, etc. If one or more of the above control information transmission resources are configured in the BWP blank transmission unit, the BWP blank transmission unit is called the BWP quasi blank transmission unit.

Figures 1, 5:
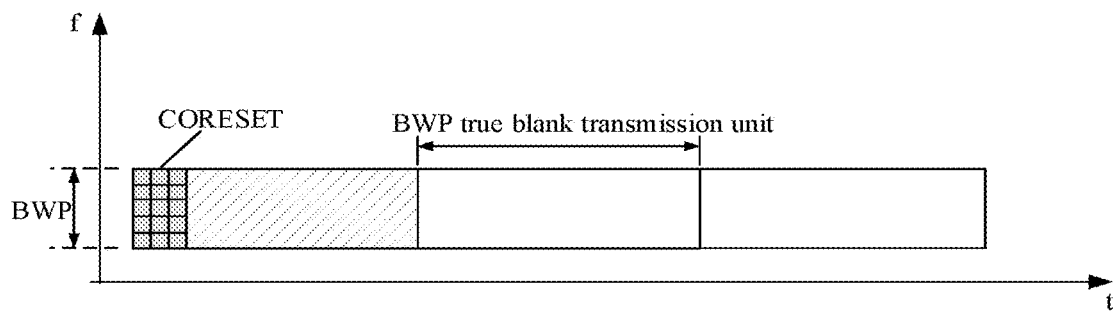
Figures 2, 5:
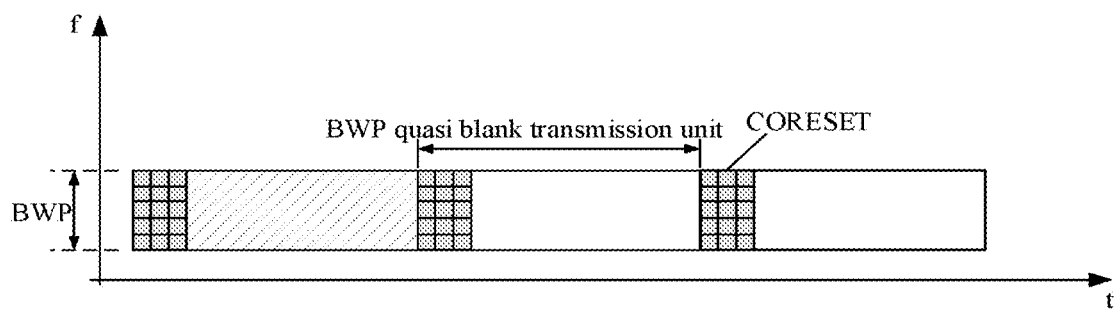
Figures 3, 5:
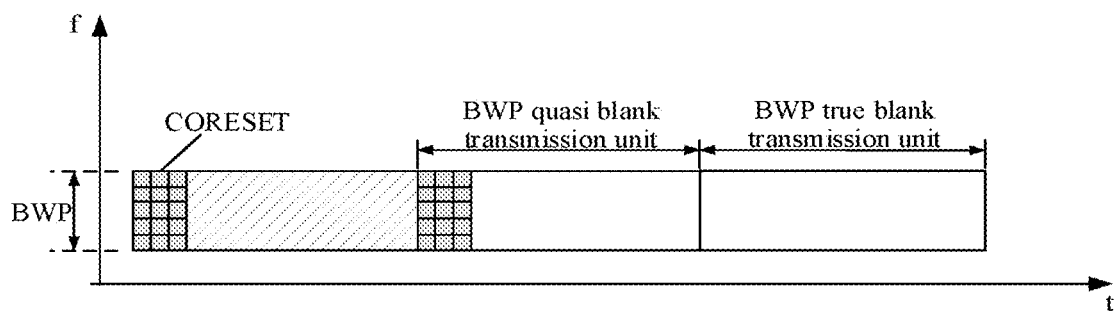

Exemplarily, corresponding to the second embodiment in the first situation, assuming that the base station plans to schedule two BWP blank transmission units for the target service data to be transmitted, a configuration diagram of the BWP blank transmission unit may be illustrated in FIG. 5-1 to FIG. 5-3.

In an embodiment of the present disclosure, as illustrated in FIG. 5-1, the base station may configure two BWP blank transmission units for the target service data to be transmitted. That is, the base station does not transmit any information with the second UE in the time-frequency range which corresponds to the two BWP blank transmission units.

In another embodiment of the present disclosure, as illustrated in the configuration diagram in FIG. 5-2, the base station may also configure two BWP quasi blank transmission units for the target service data to be transmitted. In the embodiments of the present disclosure, the CORESET is set in each BWP quasi blank transmission unit. The base station may send Downlink Control Information (DCI) to the second UE through the CORESET of the BWP quasi blank transmission unit, but does not transmit the 5G NR service data with the second UE.

In another embodiment of the present disclosure, as illustrated in FIG. 5-3, the base station may also configure a BWP quasi blank transmission unit set with the CORESET and a BWP true blank transmission unit for the target service data to be transmitted. The base station may send the DCI to the UE supporting the 5G NR network communication protocol through the CORESET of the BWP quasi blank transmission unit, but does not transmit the 5G NR service data with the second UE.

It can be seen that if the base station configures the BWP quasi blank transmission unit for the service data to be transmitted, the base station may use the control information transmission resource of the BWP quasi blank transmission unit to send the DCI to the UE. The UE includes the second UE and/or the first UE. Correspondingly, the DCI may include: the DCI for the second UE, such as scheduling control information of a normal BWP transmission unit planned to be scheduled subsequently, and/or control information such as the first resource configuration information for the first UE.

In the present disclosure, the base station may deliver the configuration information to the target UE through the broadcast signaling, the upper signaling or a Physical Downlink Control Channel (PDCCH) signaling of a physical layer. The upper signaling may be Radio Resource Control (RRC) signaling and Medium Access Control (MAC) Control Element (CE) signaling. The configuration information of the BWP blank transmission unit is transmitted in a manner similar to related technologies, which will not be described here.

In another embodiment of the present disclosure, if the current base station belongs to the base station that synchronously supports the 5G NR communication protocol and the non-5G NR communication protocol, the current base station may be called a common mode base station in the present disclosure. Regarding the transmission of the first resource configuration information, if the common mode base station does not use the system broadcast signaling to transmit the first resource configuration information to the first UE, the common mode base station may transmit the first resource configuration information to the first UE in at least one of the following manners.

First manner, if the first UE supports the 5G NR communication protocol, the base station may send the first resource configuration information to the first UE through the CORESET of the BWP quasi blank transmission unit.

Figure 6:
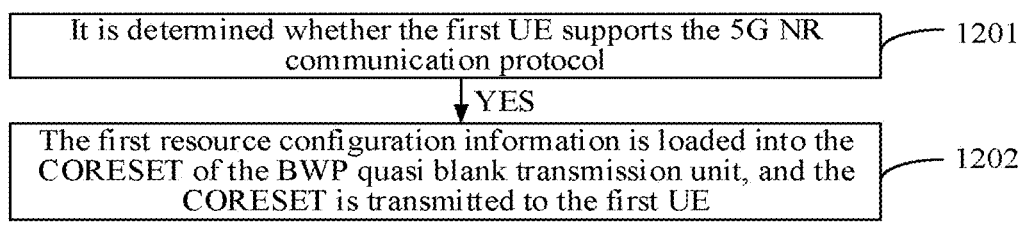
FIG. 6 is a flowchart of another method for transmitting information according to an exemplary embodiment of the present disclosure.

Referring to FIG. 6 that illustrates a flowchart of another method for transmitting information according to an exemplary embodiment, the operation that the first resource configuration information is transmitted to the first UE may include the following steps.

In block 1201, it is determined whether the first UE supports the 5G NR communication protocol.

In the present disclosure, the common mode base station may determine whether the first UE supports the 5G NR communication protocol according to device information of the first UE, for example, the radio frequency support capability reported by the UE.

In block 1202, if the first UE supports the 5G NR communication protocol, the first resource configuration information is loaded into the CORESET of the BWP quasi blank transmission unit, and the CORESET is transmitted to the first UE.

In the present disclosure, if the first UE supports the 5G NR communication protocol, and the common mode base station may determine that the first UE may detect the DCI configured in the BWP quasi blank transmission unit, the common mode base station may load the first resource configuration information into the CORESET of the BWP quasi blank transmission unit, and transmit the CORESET to the first UE through 5G NR system resources, which saves the overhead of control information transmission resource of the first transmission resource.

The first resource configuration information may include: the system control information and the scheduling control information. The system control information is used for informing the first UE of information such as the time-frequency range, the reference signal configuration of the first transmission resource to be scheduled. The scheduling control information is used for informing the first UE of how the base station will schedule the first transmission resource, and may include: the allocation of uplink and downlink transmission resources, such as a ratio of uplink and downlink sub-frames, a modulation and demodulation mode and other control information. Based on this, in another embodiment of the present disclosure, the common mode base station may transmit the system control information and the scheduling control information, which are included in the first resource configuration information, to the first UE respectively.

For example, the common mode base station may deliver the system control information in the first resource configuration information to the first UE through the broadcast signaling of the 5G NR system, and transmit the scheduling control information for the first transmission resource to the first UE through the CORESET in the BWP quasi blank transmission unit.

Figure 7:
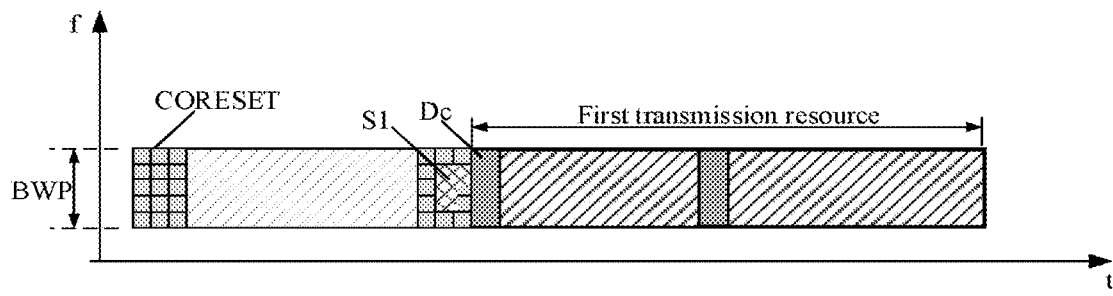
FIG. 7 is a schematic diagram of another scenario of transmitting information according to an exemplary embodiment of the present disclosure.

In another embodiment of the present disclosure, the common mode base station may also transmit the system control information included in the first resource configuration information to the first UE through the CORESET in the BWP quasi blank transmission unit. When the common mode base station schedules the first transmission resource, the scheduling control information of the first transmission resource is delivered to the first UE through the control information transmission resource in the first transmission resource. Referring to FIG. 7 that illustrates a schematic diagram of another scenario of transmitting information according to an exemplary embodiment, and corresponding to the configuration of the BWP blank transmission unit illustrated in FIG. 5-2, the common mode base station may load the system control information Si of the first transmission resource into the CORESET of the BWP quasi blank transmission unit, and transmit the CORESET to the first UE in advance. When scheduling the first transmission resource, the common mode base station loads the scheduling control information into the control information transmission resource Dc of the first transmission resource, and transmit the Dc to the first UE, which may also save control signaling overhead of the first transmission resource.

Second manner, no matter whether the first UE supports the 5G NR communication protocol, when scheduling the first transmission resource at the position of the BWP blank transmission unit, the common mode base station can send, based on the non-5G NR communication protocol such as the LTE communication protocol, the first resource configuration information to the first UE through the control information transmission resource configured in the first transmission resource, which is similar to related technologies. A detailed description will be given in combination with the scheduling of the first transmission resource in block 13.

In block 13, the first transmission resource is scheduled at the time-frequency position of the BWP blank transmission unit, so as to use the first transmission resource to transmit the target service data.

In the present disclosure, the base station performing the operation in block 13 may be either the non-5G NR base station or the common mode base station. The base station may schedule the first transmission resource at the position of the BWP blank transmission unit based on the first resource configuration information.

The base station may schedule the first transmission resource at the time-frequency position of the BWP blank transmission unit when subsequently performs resource scheduling. Taking that the target service data is the eMTC service as an example, since the transmission of the eMTC service data uses the LTE communication protocol, the base station takes the frame as the basic scheduling unit to schedule the first transmission resource.

Figures 1, 8:
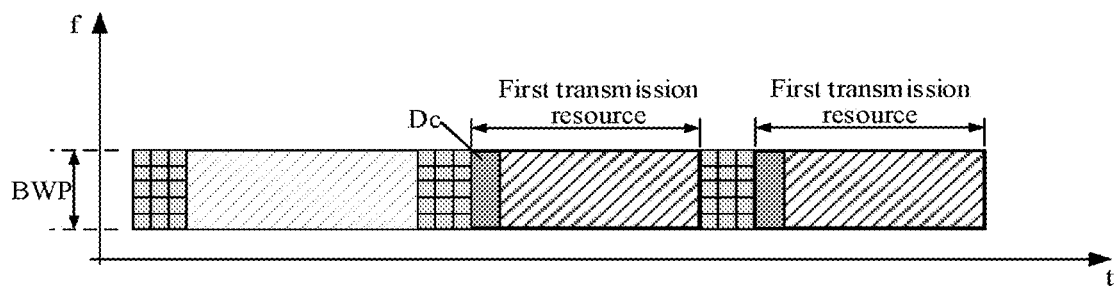
Figures 2, 8:
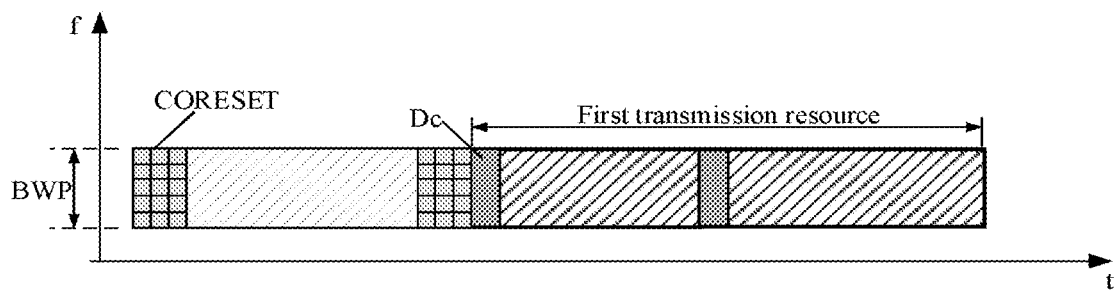
Figures 3, 8:
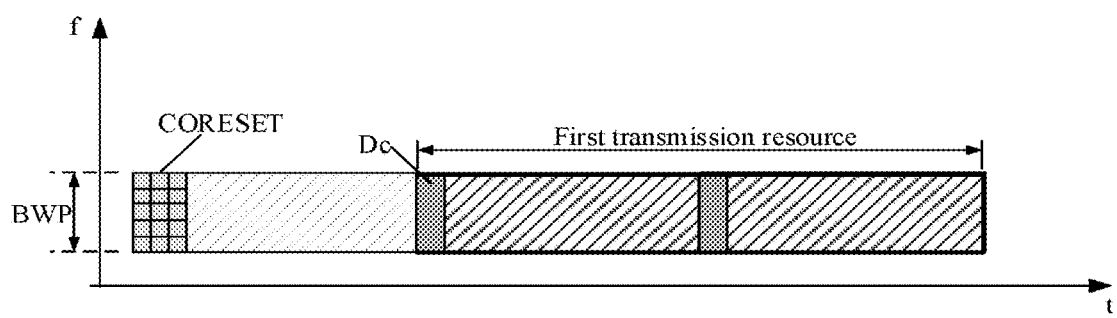

FIG. 8-1 and FIG. 8-3 respectively illustrate a schematic diagram that the base station schedules the first transmission resource, which correspond to FIG. 5-1 and FIG. 5-3. The base station may schedule the first transmission resource at a blank position of the BWP quasi blank transmission unit and the whole BWP true blank transmission unit. The first transmission resources may include the control information transmission resource Dc and data information transmission resource.

According to related knowledge, when scheduling the first transmission resource, the base station may load the first resource configuration information into the control information transmission resource Dc of the first transmission resource and send the Dc to the first UE.

In the present disclosure, the target service data may be the eMTC and NB IoT services that perform data transmission based on the LTE communication protocol.

To sum up, when there is other target service data transmitted based on the non-5G NR transmission protocol in the 5G NR system, the BWP blank transmission unit may be set for the target service data to be transmitted, to reserve the location for the base station to schedule the first transmission resource for transmitting the target service data, so that when scheduling the transmission resource, the base station may schedule the first transmission resource at the position of the BWP blank transmission unit according to the first resource configuration information. After delivering the first resource configuration information to the first UE transmitting the target service data and delivering the configuration information of the BWP blank transmission unit to the second UE transmitting the 5G NR service, the base station may flexibly schedule the first transmission resource for the first UE during scheduling the transmission resource of the 5G NR service for the second UE, which realizes converged transmission of a variety of services, enables the 5G NR base station to schedule the transmission resource for the UE that does not support the 5G NR network communication protocol, enhances the service types supported by the 5G NR system, and improves the user experience of the 5G NR network.

Figure 9:
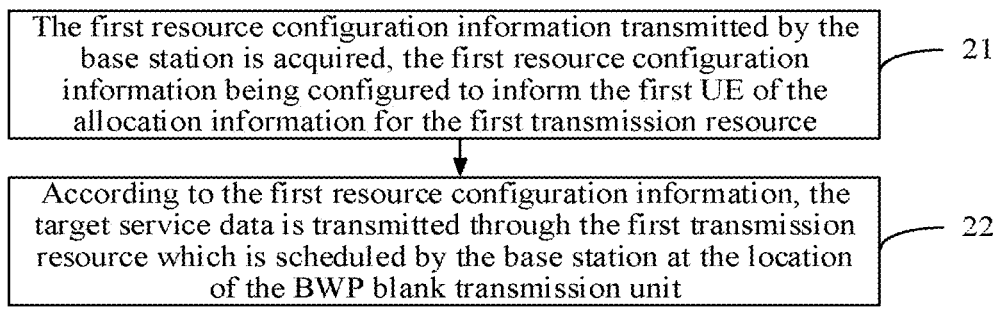
FIG. 9 is a flowchart of a method for transmitting information according to an exemplary embodiment of the present disclosure.

Correspondingly, the present disclosure also provides a method for transmitting information, which is applied to the first UE. As mentioned above, the first UE may transmit the target service data based on the non-5G NR network communication protocol at present. Referring to FIG. 9 that illustrates a flowchart of a method for transmitting information according to an exemplary embodiment, the method may include the following steps.

In block 21, the first resource configuration information transmitted by the base station is acquired, the first resource configuration information being configured to inform the first UE of the allocation information for the first transmission resource.

Corresponding to the operation that how the base station transmits the first resource configuration information to the first UE in block 13, in the present disclosure, the first UE may acquire the first resource configuration information in at least two following manners.

First manner, if the first UE supports the 5G NR network communication protocol, the first UE may acquire the first resource configuration information based on the 5G NR network communication protocol.

Figure 10:
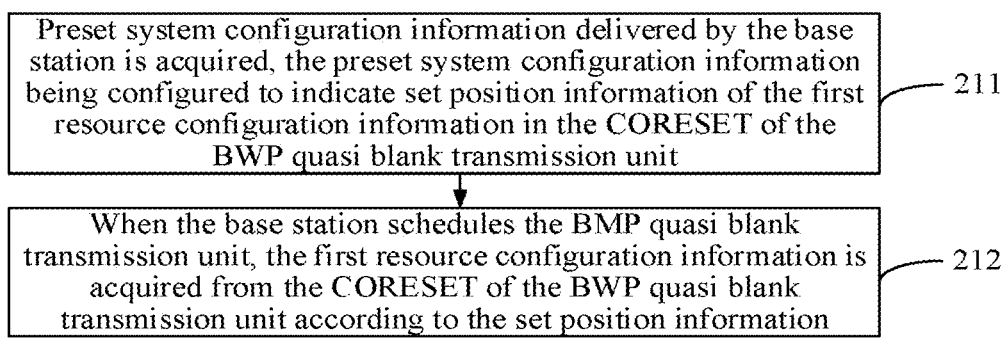
FIG. 10 is a flowchart of another method for transmitting information according to an exemplary embodiment of the present disclosure.

Referring to FIG. 10 that illustrates a flowchart of another method for transmitting information according to an exemplary embodiment, block 21 may include the following steps.

In block 211, preset system configuration information delivered by the base station is acquired, the preset system configuration information being configured to indicate set position information of the first resource configuration information in the CORESET of the BWP quasi blank transmission unit.

In an embodiment, the preset system configuration information may include: the time-frequency resource range of the BWP quasi blank transmission unit, the time-frequency resource range of the CORESET, and the set position of the first resource configuration information in the CORESET.

In another embodiment of the present disclosure, if the position of the CORESET in each BWP transmission unit is appointed in the 5G NR network communication protocol, the first system control information may not include the time-frequency resource range of the CORESET.

In the present disclosure, the first resource configuration information may include the system control information and the scheduling control information. The system control information is used for informing information such as the first UE of the time-frequency range, the reference signal configuration of the first transmission resource to be scheduled. The scheduling control information is used for informing the first UE of how the base station will schedule the first transmission resource, and may include the allocation of uplink and downlink transmission resources, such as the ratio of uplink and downlink sub-frames, the modulation and demodulation mode and other control information. Based on this, the set position of the first resource configuration information in the CORESET may include the following three situations: first situation, the set position information of all the first resource configuration information in the CORESET of the BWP quasi blank transmission unit; second situation, the set position information of the system control information of the first transmission resource in the CORESET of the BWP quasi blank transmission unit; and third situation, the set position information of the scheduling control information of the first transmission resource in the CORESET of the BWP quasi blank transmission unit. In the third situation, the preset system configuration information received by the first UE further includes the system control information of the first transmission resource.

In S212, when the base station schedules the BMP quasi blank transmission unit, the first resource configuration information is acquired from the CORESET of the BWP quasi blank transmission unit according to the set position information.

After acquiring and parsing the preset system configuration information through the 5G NR network communication protocol, when the base station schedules the CORESET of the BWP quasi blank transmission unit, the first UE may parse, according to the set position information, the first resource configuration information belonging to the first UE from the preset resource position of the CORESET of the BWP quasi blank transmission unit.

Corresponding to the first situation, the first UE may search and parse all the first resource configuration information from the CORESET of the BWP quasi blank transmission unit according to the preset position information.

Corresponding to the second situation, the first UE may acquire the system control information of the first transmission resource, i.e., a part of the first resource configuration information, from the CORESET of the BWP quasi blank transmission unit according to the preset position information. The system control information of the first transmission resource may include: the time-frequency range of the first transmission resource, the location, in the first transmission resource, of the scheduling control information of the first transmission resource, etc. When the base station schedules the first transmission resource later, the first UE may acquire the scheduling control information from the first transmission resource according to information such as the position of the scheduling control information in the first transmission resource.

Corresponding to the third situation, the first UE may acquire the system control information of the first transmission resource from the preset system configuration information. Then, when scheduling the BWP quasi blank transmission unit, the base station acquires the scheduling control information of the first transmission resource from the CORESET of the BWP quasi blank transmission unit according to the set position information, in the CORESET of the BWP quasi blank transmission unit, of the scheduling control information of the first transmission resource.

Figure 11:
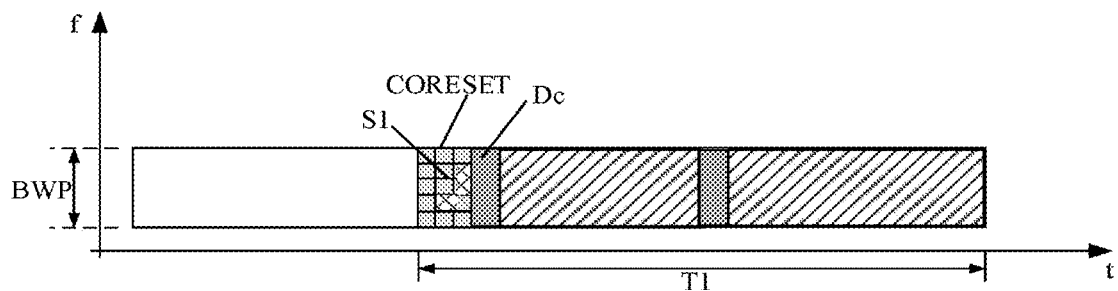
FIG. 11 is a schematic diagram of another scenario of transmitting information according to an exemplary embodiment of the present disclosure.

FIG. 11 illustrates a schematic diagram of another scenario of transmitting information. For the first UE, the resources corresponding to a time interval T1 in the BWP belongs to effective resources. After acquiring the first resource configuration information from the control information transmission resource in the effective resources, the first UE may use, according to the scheduling control information of the first transmission resource, the first transmission resource to transmit the preset target service data, such as the eMTC and NB IoT service data. The control information transmission resource in the effective resources includes the control information transmission resource Dc in the first transmission resource and the CORESET of the BWP quasi blank transmission unit.

Second manner, the first UE does not support the 5G NR network communication protocol. Similar to related technologies, when detecting the first transmission resource scheduled by the base station, the first UE acquires the first resource configuration from the preset control information transmission resource of the first transmission resource according to the traditional network communication protocol. The first resource configuration information may include: DCI such as the time-frequency range, the reference signal configuration, the scheduling control information of the first transmission resource.

Figure 12:
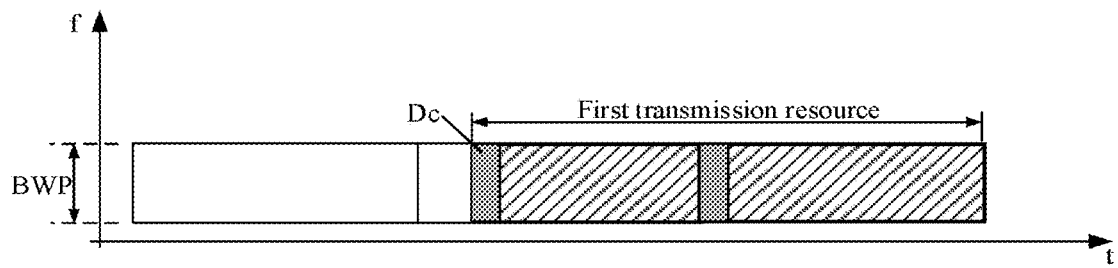
FIG. 12 is a schematic diagram of another scenario of transmitting information according to an exemplary embodiment of the present disclosure.

FIG. 12 illustrates a schematic diagram of another scenario of transmitting information according to an exemplary embodiment. Corresponding to FIG. 8-2, FIG. 12 illustrates the scheduling of the first transmission resource monitored by the first UE.

In block 22, according to the first resource configuration information, the target service data is transmitted through the first transmission resource which is scheduled by the base station at the position of the BWP blank transmission unit.

Corresponding to the first situation and the third situation, after acquiring the first resource configuration information and completing transmission configuration, the first UE may use the first transmission resource scheduled by the base station to transmit the target service data.

Corresponding to the second situation, after acquiring the scheduling control information of the first transmission resource from the first transmission resource scheduled by the base station, the first UE may perform related transmission configuration. After completing the transmission configuration, the first UE uses a data transmission resource in the first transmission resource scheduled by the base station to transmit the target service data.

Figure 13:
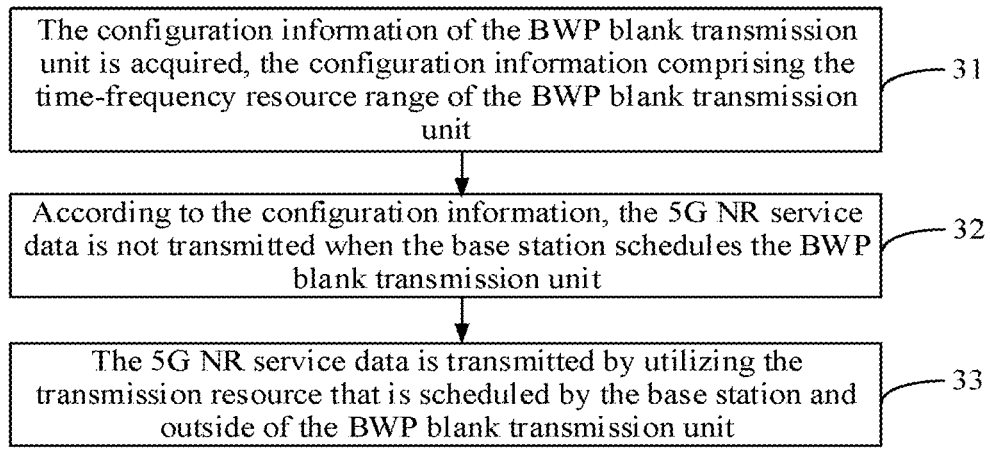
FIG. 13 is a flowchart of a method for transmitting information according to an exemplary embodiment of the present disclosure.

Correspondingly, the present disclosure also provides a method for transmitting information which is applied to the second UE. Referring to FIG. 13 that illustrates a flowchart of a method for transmitting information according to an exemplary embodiment, the method is applied to the second UE for transmitting the 5G NR data service, the 5G NR data service being the data service transmitted based on the 5G NR communication protocol. The method may include the following steps.

In block 31, the configuration information of the BWP blank transmission unit is acquired, the configuration information including the time-frequency resource range of the BWP blank transmission unit.

In block 32, according to the configuration information, the 5G NR service data is not transmitted when the base station schedules the BWP blank transmission unit.

In block 33, the 5G NR service data is transmitted by utilizing the transmission resource that is scheduled by the base station and outside of the BWP blank transmission unit.

For the second UE, the situation where the base station schedules the transmission resource which is detected by the second UE may be illustrated in FIG. 5-1 to FIG. 5-3. When the base station schedules the BWP blank transmission unit, the second UE does not transmit any service data in the time-frequency range of the BWP blank transmission unit. However, in the schematic diagrams illustrated in FIG. 5-1 and FIG. 5-2, if the base station loads the DCI for the second UE in the control information transmission resource of the BWP quasi blank transmission unit, the second UE may acquire the DCI belonging to the second UE from the control information transmission resource of the BWP quasi blank transmission unit.

For simple description, each of the above method embodiments is expressed as a combination of a series of operations, but those skilled in the art should know that the present disclosure is not limited to the described operation sequence because some steps may be executed in other sequences or at the same time according to the present disclosure. Of course, those skilled in the art should understand that the embodiments described in the specification are exemplary embodiments, and the operations and modules involved are not necessarily necessary for the present disclosure.

Corresponding to the embodiments of an application function realization method, the present disclosure also provides embodiments of an application function realization device and a corresponding terminal.

Figure 14:
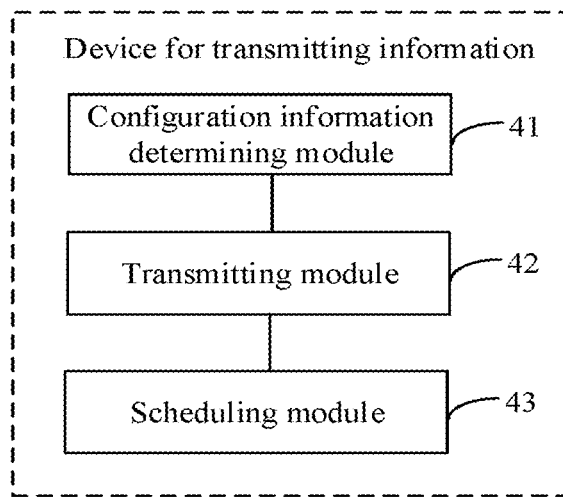
FIG. 14 is a block diagram of a device for transmitting information according to an exemplary embodiment of the present disclosure.

Correspondingly, the present disclosure provides a device for transmitting information, which may be configured in the base station. Referring to FIG. 14 that illustrates a block diagram of a device for transmitting information according to an exemplary embodiment, the device may include a configuration information determining module 41 that is configured to determine the configuration information of the BWP blank transmission unit in the 5G NR system, the configuration information at least including: the time-frequency resource range of the BWP blank transmission unit. The device can further include a transmitting module 42 that is configured to transmit the resource configuration information to the UE based on the configuration information of the BWP blank transmission unit, and a scheduling module 43 that is configured to schedule the first transmission resource at the time-frequency position of the BWP blank transmission unit, so as to utilize the first transmission resource to transmit the target service data, the first transmission resource being the resource scheduled based on the non-5G NR communication protocol. Of course, it should be understood that one or more of the modules described in this disclosure can be implemented by processing circuitry.

Figure 15:
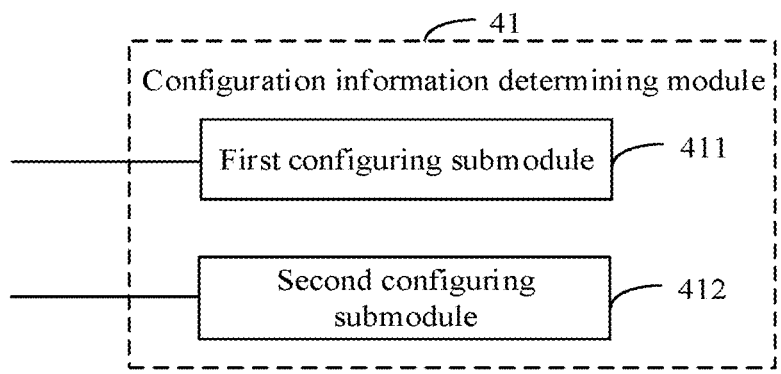
FIG. 15 is a block diagram of another device for transmitting information according to an exemplary embodiment of the present disclosure.

In another device embodiment of the present disclosure, the base station may include the 5G NR base station. Referring to FIG. 15 that illustrates a block diagram of another device for transmitting information according to an exemplary embodiment, based on the device embodiment illustrated in FIG. 14, the configuration information determining module 41 may include a first configuring submodule 411 that is configured to determine, according to the preset resource configuration rule, the configuration information of the BWP blank transmission unit within the preset frequency range of the 5G NR system. Alternatively, the configuration information determining module 41 can include a second configuring submodule 412 that is configured to determine, according to the information of the target service to be transmitted, the configuration information of the BWP blank transmission unit, the information of the target service to be transmitted at least including the type of the non-5G NR communication protocol applicable to the target service data to be transmitted.

Figure 16:
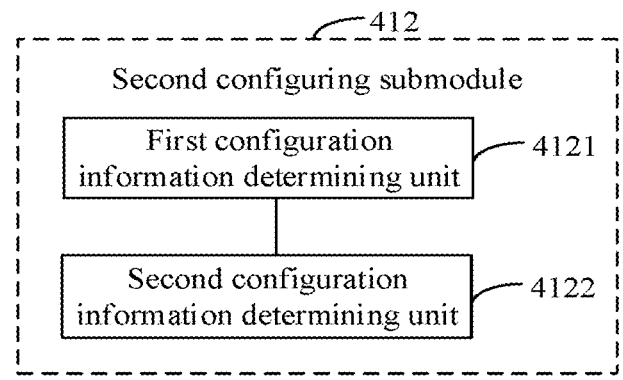
FIG. 16 is a block diagram of another device for transmitting information according to an exemplary embodiment of the present disclosure.

In another device embodiment of the present disclosure, if the base station belongs to the common mode base station that synchronously supports the 5G NR communication protocol and the non-5G NR communication protocol, referring to FIG. 16 that illustrates a block diagram of another device for transmitting information according an exemplary embodiment, based on the device embodiment illustrated in FIG. 15, the second configuring submodule 412 may include a first configuration information determining unit 4121 that is configured to determine the first resource configuration information for the target service data to be transmitted, the first resource configuration information being the configuration information for allocating the transmission resource for the first UE based on the non-5G NR communication protocol, and the first UE being the UE for transmitting the target service data, and a second configuration information determining unit 4122 that is configured to determine, according to the first resource configuration information, the configuration information of the BWP blank transmission unit in the 5G NR system.

In another device embodiment for transmitting information of the present disclosure, the transmitting module 42 may include a blank configuration transmitting submodule that is configured to transmit, by the 5G NR base station, the configuration information of the BWP blank transmission unit to the second UE used for transmitting 5G NR service data.

Figure 17:
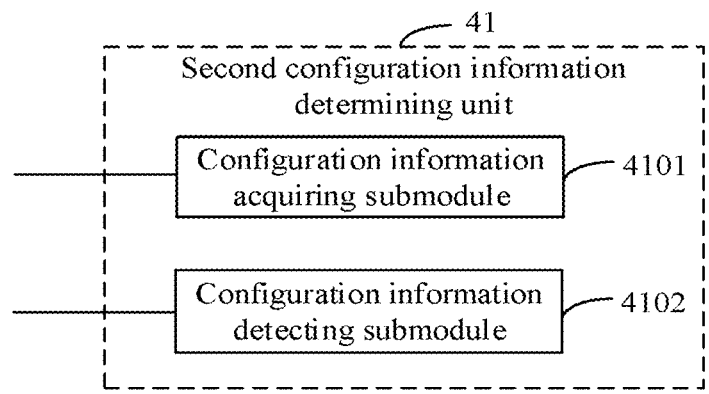
FIG. 17 is a block diagram of another device for transmitting information according to an exemplary embodiment of the present disclosure.

In another device embodiment of the present disclosure, if the base station belongs to the non-5G NR base station, referring to FIG. 17 that illustrates a block diagram of another device for transmitting information according an exemplary embodiment, based on the device embodiment illustrated in FIG. 14, the configuration information determining module 41 may include a configuration information acquiring submodule 4101 that is configured to acquire the configuration information of the BWP blank transmission unit transmitted by the 5G NR base station. Alternatively, the configuration information determining module 41 can include a configuration information detecting submodule 4102 that is configured to detect, according to reference signal configuration information of the 5G NR system, the configuration information of the BWP blank transmission unit.

Figure 18:
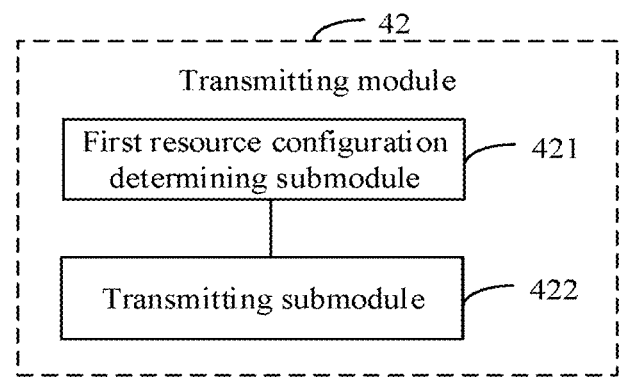
FIG. 18 is a block diagram of another device for transmitting information according to an exemplary embodiment of the present disclosure.

In another device embodiment of the present disclosure, if the configuration information of the BWP blank transmission unit determined by the configuration information determining module 41 is the periodic configuration information of the BWP blank transmission unit, referring to FIG. 18 that illustrates a block diagram of another device for transmitting information according to an exemplary embodiment, based on the device embodiment illustrated in FIG. 14, the transmitting module 42 may include a first resource configuration determining submodule 421 that is configured to determine the first resource configuration information according to the information of the target service to be transmitted and the periodic configuration information of the BWP blank transmission unit, and a transmitting submodule 422 that is configured to transmit the first resource configuration information to the first UE used for transmitting the target service data.

In the device for transmitting information provided by the present disclosure, the BWP blank transmission unit may include: the BWP quasi blank transmission unit which is configured with the control information transmission resource, or the BWP true blank transmission unit which is not configured with the control information transmission resource.

Figure 19:
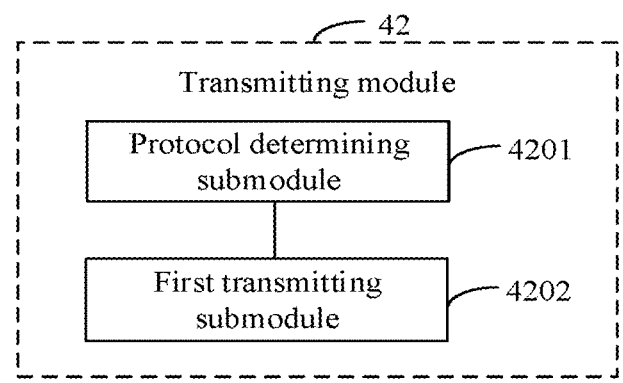
FIG. 19 is a block diagram of another device for transmitting information according to an exemplary embodiment of the present disclosure.

In another device embodiment of the present disclosure, if the base station synchronously supports the 5G NR communication protocol and the non-5G NR communication protocol, and the BWP blank transmission unit configured by the base station includes the BWP quasi blank transmission unit which is configured with the CORESET, referring to FIG. 19 that illustrates a block diagram of another device for transmitting information according to an exemplary embodiment, the transmitting module 42 may include a protocol determining submodule 4201 that is configured to determine whether the first UE supports the 5G NR communication protocol, and first transmitting submodule 4202 that is configured to load, if the first UE supports the 5G NR communication protocol, the first resource configuration information into the CORESET of the BWP quasi blank transmission unit, and transmit the CORESET to the first UE.

Figure 20:
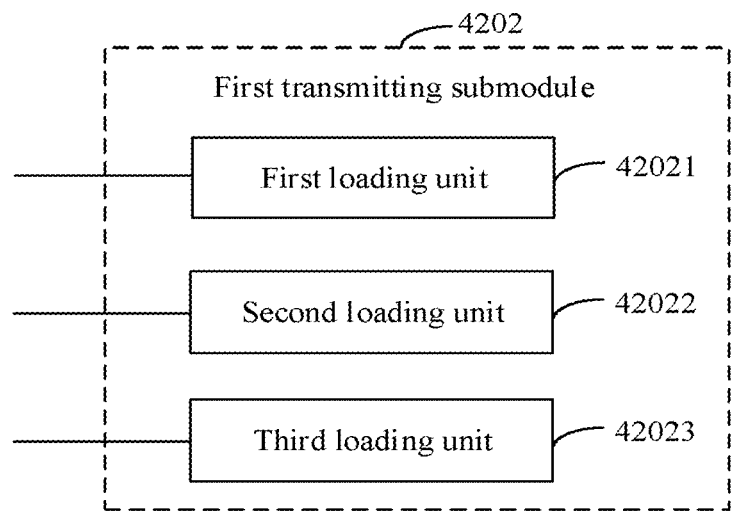
FIG. 20 is a block diagram of another device for transmitting information according to an exemplary embodiment of the present disclosure.

In another exemplary device embodiment of the present disclosure, the first resource configuration information may include the scheduling control information of the first transmission resource and the system control information. Referring to FIG. 20 that illustrates a block diagram of another device for transmitting information according an exemplary embodiment, based on the device embodiment illustrated in FIG. 19, the first transmitting submodule 4202 may include any one of the following loading units: a first loading unit 42021, configured to load the scheduling control information of the first transmission resource and the system control information into the CORESET of the BWP quasi blank transmission unit, a second loading unit 42022, configured to load the system control information into the CORESET of the BWP quasi blank transmission unit, and a third loading unit 42023, configured to load the scheduling control information of the first transmission resource into the CORESET of the BWP quasi blank transmission unit.

In any device embodiment provided by the present disclosure, the target service data may include: the eMTC and NB IoT services that perform data transmission based on the communication protocol of the LTE system.

Correspondingly, the present disclosure also provides a device for transmitting information, which is configured in the first UE for transmitting the target service data, the target service data being the service data transmitted based on the non-5G NR communication protocol.

Figure 21:
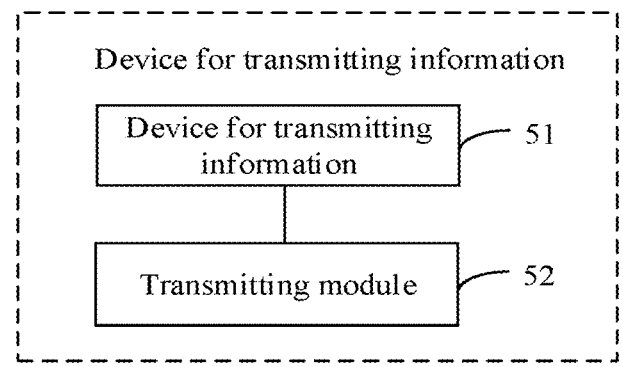
FIG. 21 is a block diagram of a device for transmitting information according to an exemplary embodiment of the present disclosure.

Referring to FIG. 21 that illustrates a block diagram of a device for transmitting information according to an exemplary embodiment, the device may include an information acquiring module 51 that is configured to acquire the first resource configuration information which is transmitted by the base station, the first resource configuration information being configured to inform the first UE of the allocation information for the first transmission resource. Additionally, the device can include a transmitting module 52 that is configured to transmit, according to the first resource configuration information, the target service data through the first transmission resource which is scheduled by the base station at the time-frequency position of the BWP blank transmission unit.

Figure 22:
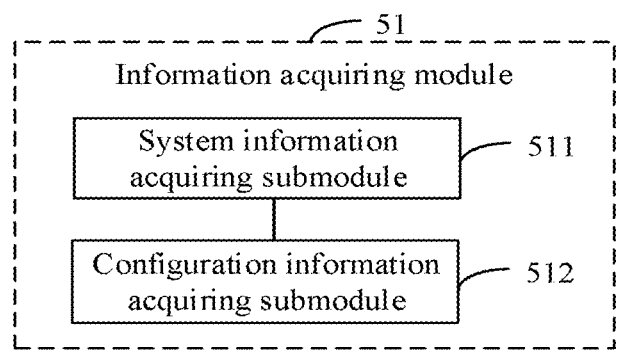
FIG. 22 is a block diagram of another device for transmitting information according to an exemplary embodiment of the present disclosure.

If the first UE supports the 5G NR communication protocol, referring to FIG. 22 that illustrates a block diagram of another device for transmitting information according to an exemplary embodiment, based on the device embodiment illustrated in FIG. 21. The information acquiring module may include a system information acquiring submodule 511 that is configured to acquire the preset system configuration information which is delivered by the base station, the preset system configuration information being configured to indicate the set position information of the first resource configuration information in the CORESET of the BWP quasi blank transmission unit. The device can also include a configuration information acquiring submodule 512 that is configured to acquire, when the base station schedules the BMP quasi blank transmission unit, the first resource configuration information from the CORESET of the BWP quasi blank transmission unit according to the set position information.

Corresponding to the method for transmitting information at the second UE, the present disclosure also provides a device for transmitting information, which is configured in the second UE for transmitting the 5G NR service data, the 5G NR service data being the service data transmitted based on the 5G NR communication protocol.

Figure 23:
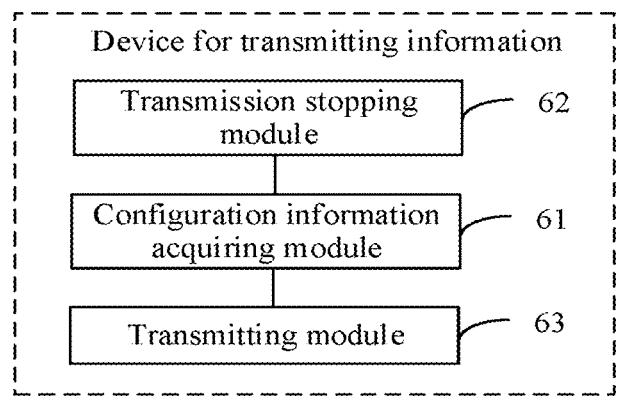
FIG. 23 is a block diagram of a device for transmitting information according to an exemplary embodiment of the present disclosure.

Referring to FIG. 23 that illustrates a block diagram of a device for transmitting information according to an exemplary embodiment, the device may include a configuration information acquiring module 61 that is configured to acquire the configuration information of the BWP blank transmission unit, the configuration information including the time-frequency resource range of the BWP blank transmission unit. Additionally, the device can include a transmission stopping module 62 that is configured to not transmit, according to the configuration information, the 5G NR service data when the base station schedules the BWP blank transmission unit, and a transmitting module 63 that is configured to transmit the 5G NR service data by utilizing the transmission resource that is scheduled by the base station and outside of the BWP blank transmission unit.

The device embodiments substantially correspond to the method embodiments, and thus related parts refer to part of descriptions of the method embodiments. The device embodiments described above are only schematic, units described as separate parts therein may or may not be physically separated, and parts displayed as units may or may not be physical units, and namely may be located in the same place or may also be distributed to multiple network units. Part or all of the modules therein may be selected according to a practical requirement to achieve the purpose of the solutions of the present disclosure. Those of ordinary skill in the art may understand and implement without creative work.

Figure 24:
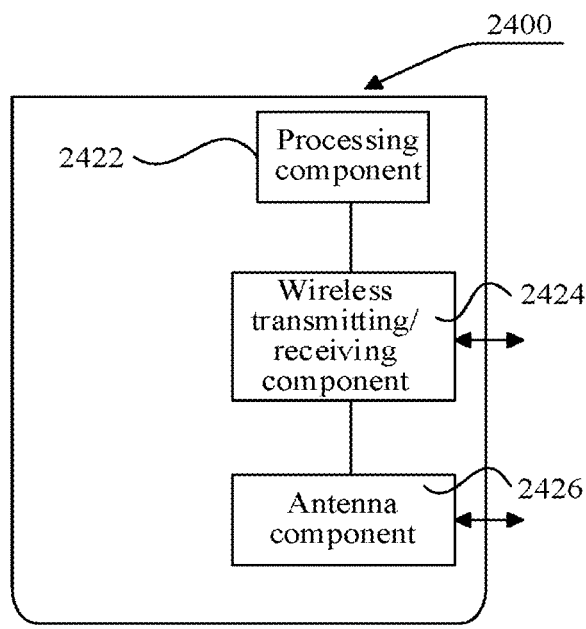
FIG. 24 is a structural schematic diagram of a base station according to an exemplary embodiment of the present disclosure.

FIG. 24 illustrates a structural schematic diagram of a base station 2400 according to an exemplary embodiment. The base station may be the 5G NR base station, the base station that synchronously supports the 5G NR communication protocol and the non-5G NR communication protocol, or the non-5G NR base station. Referring to FIG. 24, the base station 2400 includes a processing component 2422, a wireless transmitting/receiving component 2424, an antenna component 2426, and a special signal processing part of a wireless interface. The processing component 2422 may further include one or more processors.

One of the processors in the processing component 2422 may be configured to determine the configuration information of the BWP blank transmission unit in the 5G NR system, the configuration information at least including the time-frequency resource range of the BWP blank transmission unit, transmit the resource configuration information to the UE based on the configuration information of the BWP blank transmission unit, and schedule the first transmission resource at the time-frequency position of the BWP blank transmission unit, so as to utilize the first transmission resource to transmit target service data, the first transmission resource being the resource scheduled based on the non-5G NR communication protocol.

In an exemplary embodiment, there is further provided a non-temporary computer readable storage medium including instructions, on which computer instructions are stored. The computer instructions may be executed by the processing component 2422 of the base station 2400 to complete the method for transmitting information as illustrated in any one of FIG. 1 to FIG. 8-3. For example, the non-temporary computer-readable storage medium may be a Read-Only Memory (ROM), a Random Access Memory (RAM), a Compact Disc Read-Only Memory (CD-ROM), a magnetic tape, a floppy disc, an optical data storage device and the like.

Figure 25:
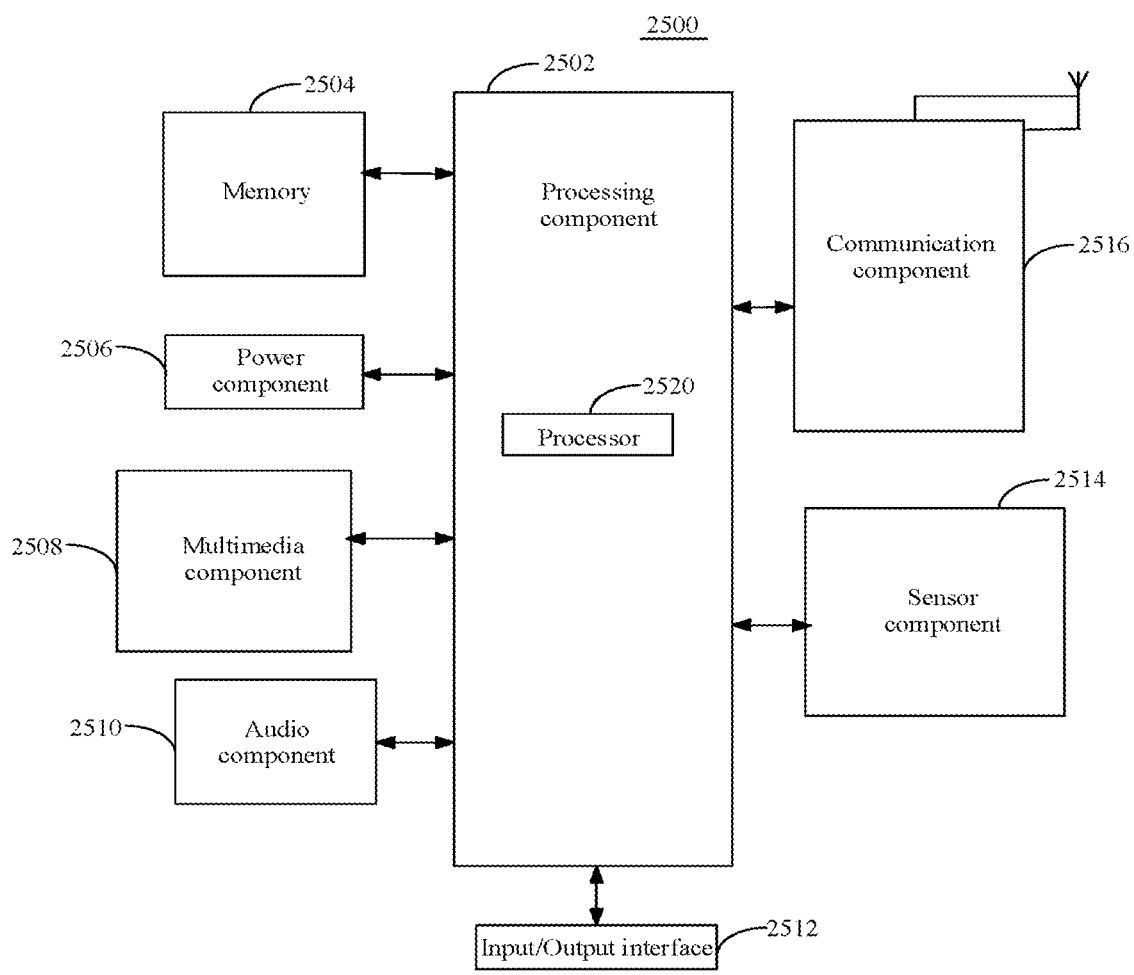
FIG. 25 is a structural schematic diagram of UE according to an exemplary embodiment of the present disclosure.

FIG. 25 illustrates a structural schematic diagram of UE 2500 according to an exemplary embodiment. For example, the UE 2500 may be either the first UE for transmitting the target service data or the second UE for transmitting the 5G NR service data. Specifically, the UE 2500 may be a mobile phone, a computer, a digital broadcast terminal, a messaging device, a gaming console, a tablet, a medical device, exercise equipment, a personal digital assistant, and wearable devices such as a smart watch, intelligent glasses, a smart bracelet, and smart running shoes.

Referring to FIG. 25, the device 2500 may include one or more of the following components: a processing component 2502, a memory 2504, a power component 2506, a multimedia component 2508, an audio component 2510, an Input/Output (I/O) interface 2512, a sensor component 2514, and a communication component 2516.

The processing component 2502 typically controls overall operations of the device 2500, such as the operations associated with display, telephone calls, data communications, camera operations, and recording operations. The processing component 2502 may include one or more processors 2520 to execute instructions to perform all or part of the steps in the above method. Moreover, the processing component 2502 may include one or more modules which facilitate interaction between the processing component 2502 and the other components. For instance, the processing component 2502 may include a multimedia module to facilitate interaction between the multimedia component 2508 and the processing component 2502.

The memory 2504 is configured to store various types of data to support the operation of the device 2500. Examples of such data include instructions for any application programs or methods operated on the device 2500, contact data, phonebook data, messages, pictures, video, etc. The memory 2504 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 2506 provides power for various components of the device 2500. The power component 2506 may include a power management system, one or more power supplies, and other components associated with generation, management and distribution of power for the device 2500.

The multimedia component 2508 includes a screen which provides an output interface between the device 2500 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensor may not only sense a boundary of a touch or swipe action but also detect a length and pressure associated with the touch or swipe action. In some embodiments, the multimedia component 2508 includes a front camera and/or a rear camera. The front camera and/or the rear camera may receive external multimedia data when the device 2500 is in an operation mode, such as a photographing mode or a video mode. Each of the front camera and the rear camera may be a fixed optical lens system or have focusing and optical zooming capabilities.

The audio component 2510 is configured to output and/or input an audio signal. For example, the audio component 2510 includes a Microphone (MIC), and the MIC is configured to receive an external audio signal when the device 2500 is in the operation mode, such as a call mode, a recording mode and a voice recognition mode. The received audio signal may further be stored in the memory 2504 or sent through the communication component 2516. In some embodiments, the audio component 2510 further includes a speaker configured to output the audio signal.

The I/O interface 2512 provides an interface between the processing component 2502 and a peripheral interface module. The peripheral interface module may be a keyboard, a click wheel, a button, etc. The button may include, but not limited to: a home button, a volume button, a starting button and a locking button.

The sensor component 2514 includes one or more sensors which are configured to provide status assessment in various aspects for the device 2500. For instance, the sensor component 2514 may detect an on/off status of the device 2500 and relative positioning of components, such as a display and small keyboard of the device 2500, and the sensor component 2514 may further detect a change in a position of the device 2500 or a component of the device 2500, presence or absence of contact between the user and the device 2500, orientation or acceleration/deceleration of the device 2500 and a change in temperature of the device 2500. The sensor component 2514 may include a proximity sensor configured to detect presence of an object nearby without any physical contact. The sensor component 2514 may also include a light sensor, such as a Complementary Metal Oxide Semiconductor (CMOS) or Charge Coupled Device (CCD) image sensor, configured for use in an imaging application. In some embodiments, the sensor component 2514 may also include an acceleration sensor, a gyroscope sensor, a magnetic sensor, a pressure sensor, or a temperature sensor.

The communication component 2516 is configured to facilitate wired or wireless communication between the device 2500 and another device. The device 2500 may access a communication-standard-based wireless network, such as a Wireless Fidelity (WiFi) network, a 2nd-Generation (2G) or 3rd-Generation (3G) network or a combination thereof. In an exemplary embodiment, the communication component 2516 receives a broadcast signal or broadcast associated information from an external broadcast management system through a broadcast channel. In an exemplary embodiment, the communication component 2516 further includes an NFC module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology, and other technology.

In an exemplary embodiment, the device 2500 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the above method.

In an exemplary embodiment, a non-transitory computer-readable storage medium including an instruction is also provided, such as the memory 2504 including an instruction. The instruction may be executed by the processor 2520 of the device 2500 to implement the method for transmitting information as illustrated in any one of FIG. 9 to FIG. 13. For example, the non-temporary computer-readable storage medium may be a Read-Only Memory (ROM), a Random Access Memory (RAM), a Compact Disc Read-Only Memory (CD-ROM), a magnetic tape, a floppy disc, an optical data storage device, and the like.

Other implementation solutions of the present disclosure will be apparent to those skilled in the art from consideration of the specification and practice of the present disclosure. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It should be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for transmitting information that is applicable to a base station, comprising:
   determining configuration information of a Bandwidth Part (BWP) blank transmission unit in a 5th Generation (5G) New Radio (NR) system, the configuration information comprising a time-frequency resource range of the BWP blank transmission unit;
   transmitting resource configuration information to User Equipment (UE) based on the configuration information of the BWP blank transmission unit; and
   scheduling a first transmission resource at a time-frequency position of the BWP blank transmission unit, so as to utilize the first transmission resource to transmit target service data, wherein the first transmission resource is a resource scheduled based on a non-5G NR communication protocol;
   wherein the base station comprises a 5G NR base station, and determining the configuration information of the BWP blank transmission unit in the 5G NR system further comprises:
   determining the configuration information of the BWP blank transmission unit within a preset frequency range of the 5G NR system according to a preset resource configuration rule, or
   determining the configuration information of the BWP blank transmission unit, according to information of a target service to be transmitted, wherein the information of the target service to be transmitted comprising the type of the non-5G NR communication protocol applicable to target service data to be transmitted;
   wherein when the base station synchronously supports a 5G NR communication protocol and the non-5G NR communication protocol, determining the configuration information of the BWP blank transmission unit according to the information of the target service to be transmitted further comprises:
   determining first resource configuration information for the target service data to be transmitted, the first resource configuration information being configuration information for allocating a transmission resource to first UE based on the non-5G NR communication protocol, and the first UE being UE for transmitting the target service data; and
   determining the configuration information of the BWP blank transmission unit in the 5G NR system according to the first resource configuration information.

2. The method of claim 1, wherein transmitting the resource configuration information to the UE based on the configuration information of the BWP blank transmission unit further comprises:

transmitting the configuration information of the BWP blank transmission unit to second UE for transmitting 5G NR service data by the 5G NR base station.

3. The method of claim 1, wherein, when the configuration information of the BWP blank transmission unit is periodic configuration information of the BWP blank transmission unit, transmitting the resource configuration information to the UE based on the configuration information of the BWP blank transmission unit further comprises:
   determining first resource configuration information according to the information of the target service to be transmitted and the periodic configuration information of the BWP blank transmission unit; and
   transmitting the first resource configuration information to the first UE for transmitting the target service data.

4. The method of claim 1, wherein the BWP blank transmission unit further comprises a BWP quasi blank transmission unit which is configured with a control information transmission resource, or a BWP true blank transmission unit which is not configured with the control information transmission resource.

5. The method of claim 4, wherein, when the base station synchronously supports the 5G NR communication protocol and the non-5G NR communication protocol, and the BWP blank transmission unit configured by the base station comprises the BWP quasi blank transmission unit which is configured with a Control Resource Set (CORESET), transmitting the resource configuration information to the UE based on the configuration information of the BWP blank transmission unit further comprises:
   determining whether the first UE supports the 5G NR communication protocol; and
   when loading the first resource configuration information into the CORESET of the BWP quasi blank transmission unit and transmitting the CORESET to the first UE when the first UE supports the 5G NR communication protocol.

6. The method of claim 5, wherein the first resource configuration information further comprises:
   scheduling control information of the first transmission resource and system control information; and
   configuring the first resource configuration information into the CORESET of the BWP quasi blank transmission unit comprises one of:
   configuring the scheduling control information of the first transmission resource and the system control information into the CORESET of the BWP quasi blank transmission unit;
   configuring the system control information into the CORESET of the BWP quasi blank transmission unit; or
   configuring the scheduling control information of the first transmission resource into the CORESET of the BWP quasi blank transmission unit.

7. The method of claim 1, wherein the target service data further comprises: enhanced Machine Type Communication (eMTC) and Narrow Band Internet of Things (NB IoT) services that perform data transmission based on the communication protocol of a Long Term Evolution (LTE) system.

8. A method for transmitting information that is applicable to first User Equipment (UE) for transmitting target service data, wherein the target service data is service data transmitted based on a non-5th Generation (5G) New Radio (NR) communication protocol, the method comprising:
   acquiring first resource configuration information which is transmitted by a base station, the first resource configuration information being configured to inform the first UE of allocation information for a first transmission resource; and
   according to the first resource configuration information, transmitting the target service data through the first transmission resource which is scheduled by the base station at a time-frequency position of a Bandwidth Part (BWP) blank transmission unit;
   wherein when the first UE supports a 5G NR communication protocol, acquiring the first resource configuration information which is transmitted by the base station further comprises:
   acquiring preset system configuration information which is delivered by the base station, the preset system configuration information being configured to indicate set position information of the first resource configuration information in a Control Resource Set (CORESET) of a BWP quasi blank transmission unit; and
   when the base station schedules the BMP quasi blank transmission unit, acquiring, according to the set position information, the first resource configuration information from the CORESET of the BWP quasi blank transmission unit.

9. A device for transmitting information that is applicable to a base station, comprising:
   a processor; and
   a memory configured to store instructions executable for the processor,
   wherein the processor is configured to implement the method of claim 1.

10. The device of claim 9, wherein the base station comprises a 5G NR base station, and determining the configuration information of the BWP blank transmission unit in the 5G NR system further comprises:
    determining the configuration information of the BWP blank transmission unit within a preset frequency range of the 5G NR system according to a preset resource configuration rule; or
    determining, according to information of a target service to be transmitted, the configuration information of the BWP blank transmission unit, wherein the information of the target service to be transmitted comprising the type of the non-5G NR communication protocol applicable to target service data to be transmitted.

11. The device of claim 10, wherein the base station synchronously supports a 5G NR communication protocol and the non-5G NR communication protocol, and determining, according to the information of the target service to be transmitted, the configuration information of the BWP blank transmission unit further comprises:
    determining first resource configuration information for the target service data to be transmitted, the first resource configuration information being configuration information for allocating a transmission resource to first UE based on the non-5G NR communication protocol, and the first UE being UE for transmitting the target service data; and
    determining, according to the first resource configuration information, the configuration information of the BWP blank transmission unit in the 5G NR system.

12. The device of claim 10, wherein transmitting the resource configuration information to the UE based on the configuration information of the BWP blank transmission unit further comprises:
    transmitting the configuration information of the BWP blank transmission unit to second UE for transmitting 5G NR service data by the 5G NR base station.

13. The device of claim 9, wherein, when the configuration information of the BWP blank transmission unit determined by the configuration information determining module is periodic configuration information of the BWP blank transmission unit, transmitting the resource configuration information to the UE based on the configuration information of the BWP blank transmission unit further comprises:
   determining the first resource configuration information according to the information of the target service to be transmitted and the periodic configuration information of the BWP blank transmission unit; and
   transmitting the first resource configuration information to the first UE for transmitting the target service data.

14. A device for transmitting information that is comprised in first User Equipment (UE) for transmitting target service data, wherein the target service data is service data transmitted based on a non-5th Generation (5G) New Radio (NR) communication protocol, the device comprising:
   a processor; and
   a memory configured to store instructions executable for the processor;
   wherein the processor is configured to:
   acquire first resource configuration information which is transmitted by a base station, the first resource configuration information being configured to inform the first UE of allocation information for a first transmission resource; and
   transmit the target service data through the first transmission resource which is scheduled by the base station at a time-frequency position of a Bandwidth Part (BWP) blank transmission unit according to the first resource configuration information;
   wherein when the first UE supports a 5G NR communication protocol, the processor is configured to:
   acquire preset system configuration information which is delivered by the base station, the preset system configuration information being configured to indicate set position information of the first resource configuration information in a Control Resource Set (CORESET) of a BWP quasi blank transmission unit; and
   acquire the first resource configuration information from the CORESET of the BWP quasi blank transmission unit according to the set position information when the base station schedules the BMP quasi blank transmission unit.

* * * * *